US009752016B2

(12) United States Patent
Broyles et al.

(10) Patent No.: US 9,752,016 B2
(45) Date of Patent: Sep. 5, 2017

(54) MICROTEXTURED FILMS WITH IMPROVED TACTILE IMPRESSION AND/OR REDUCED NOISE PERCEPTION

(71) Applicant: The Procter & Gamble Company, Cincinnati, OH (US)

(72) Inventors: Norman Scott Broyles, Hamilton, OH (US); April Renae Brown, Cincinnati, OH (US); Arman Ashraf, Mason, OH (US); Gary Wayne Gilbertson, Liberty Township, OH (US); Jeffrey Thomas Grothaus, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 15 days.

(21) Appl. No.: 14/709,527

(22) Filed: May 12, 2015

(65) Prior Publication Data

US 2015/0322246 A1    Nov. 12, 2015

Related U.S. Application Data

(60) Provisional application No. 61/991,923, filed on May 12, 2014, provisional application No. 62/106,242, filed on Jan. 22, 2015.

(51) Int. Cl.
*B29C 49/00* (2006.01)
*C08L 3/02* (2006.01)
(Continued)

(52) U.S. Cl.
CPC ............... *C08L 3/02* (2013.01); *B32B 27/08* (2013.01); *B32B 27/22* (2013.01); *B32B 27/32* (2013.01);
(Continued)

(58) Field of Classification Search
None
See application file for complete search history.

(56) References Cited

U.S. PATENT DOCUMENTS 5,006,394 A    4/1991 Baird
5,202,173 A    4/1993 Wu et al.
(Continued)

FOREIGN PATENT DOCUMENTS

DE    102010021453 A1    12/2011
EP    0338511    10/1989
(Continued)

OTHER PUBLICATIONS

International Search Report and Written Opinion dated Aug. 7, 2015, 11 pages.
(Continued)

*Primary Examiner* — Monica Huson
(74) *Attorney, Agent, or Firm* — James C Vago (57) ABSTRACT

A film layer having a micro-textured surface is provided. The film layer has a continuous phase with one or more thermoplastic polymers, wherein at least one of the thermoplastic polymers is a low-modulus polymer having a 2% secant modulus of less than or equal to 140 MPa, and the film has from 10 wt % to 100 wt % of the low modulus thermoplastic polymer. The film layer also has a discrete phase with from 5 wt % to 45 wt % of a thermoplastic starch.

11 Claims, 2 Drawing Sheets (51) Int. Cl.
*C08J 5/18* (2006.01)
*B32B 27/32* (2006.01)
*B32B 27/08* (2006.01)
*B32B 27/22* (2006.01)
*B29L 23/00* (2006.01)

(52) U.S. Cl.
CPC .............. *C08J 5/18* (2013.01); *B29C 49/0005* (2013.01); *B29K 2003/00* (2013.01); *B29L 2023/003* (2013.01); *B32B 2307/54* (2013.01); *B32B 2555/02* (2013.01); *C08J 2323/04* (2013.01); *Y10T 428/24355* (2015.01)

(56) References Cited

U.S. PATENT DOCUMENTS

| | | |
|---|---|---|
| 5,280,055 A | 1/1994 | Tomka |
| 5,314,934 A | 5/1994 | Tomka |
| 5,362,777 A | 11/1994 | Tomka |
| 5,415,827 A | 5/1995 | Tomka et al. |
| 5,844,023 A | 12/1998 | Tomka |
| 6,096,809 A | 8/2000 | Lorcks et al. |
| 6,179,948 B1 | 1/2001 | Merrill et al. |
| 6,214,907 B1 | 4/2001 | Tomka |
| 6,218,321 B1 | 4/2001 | Lorcks et al. |
| 6,231,970 B1 | 5/2001 | Andersen et al. |
| 6,235,815 B1 | 5/2001 | Lorcks et al. |
| 6,235,816 B1 | 5/2001 | Lorcks et al. |
| 6,242,102 B1 | 6/2001 | Tomka |
| 6,440,546 B1 * | 8/2002 | Fields ................ B29C 37/0025 428/220 |
| 6,703,115 B2 | 3/2004 | Hale et al. |
| 6,808,795 B2 | 10/2004 | Noda et al. |
| 7,132,490 B2 | 11/2006 | Obuchi et al. |
| 7,172,814 B2 | 2/2007 | Hodson |
| 7,381,772 B2 | 6/2008 | Flexman |
| 7,951,438 B2 | 5/2011 | Lee et al. |
| 8,083,064 B2 | 12/2011 | Boswell et al. |
| 8,114,522 B2 | 2/2012 | Kitora et al. |
| 8,137,773 B2 | 3/2012 | Hiruma et al. |
| 8,545,971 B2 | 10/2013 | Li et al. |
| 2001/0046606 A1 * | 11/2001 | Tau .................... A22C 13/0013 428/516 |
| 2003/0035943 A1 | 2/2003 | Jones et al. |
| 2006/0068200 A1 | 3/2006 | Cleckner et al. |
| 2006/0172131 A1 | 8/2006 | Haedt et al. |
| 2007/0167929 A1 | 7/2007 | Fossum et al. |
| 2007/0255013 A1 | 11/2007 | Becraft et al. |
| 2008/0085066 A1 | 4/2008 | Curie et al. |
| 2008/0280117 A1 | 11/2008 | Knoll et al. |
| 2009/0148713 A1 | 6/2009 | Lee et al. |
| 2009/0179069 A1 | 7/2009 | Schmidt et al. |
| 2009/0263600 A1 | 10/2009 | Miyashita et al. |
| 2009/0324911 A1 | 12/2009 | Li et al. |
| 2009/0326152 A1 | 12/2009 | Li et al. |
| 2010/0264232 A1 | 10/2010 | Gruenbacher et al. |
| 2011/0172326 A1 | 7/2011 | Weismann et al. |
| 2012/0009387 A1 | 1/2012 | Wang et al. |
| 2012/0022188 A1 | 1/2012 | Changping et al. |
| 2012/0035323 A1 | 2/2012 | Donnelly |
| 2012/0057811 A1 | 3/2012 | Tucker et al. |
| 2012/0219783 A1 | 8/2012 | Nomura et al. |
| 2012/0237743 A1 | 9/2012 | ODonnell |
| 2012/0288692 A1 | 11/2012 | Broyles et al. |
| 2012/0315416 A1 | 12/2012 | Chen et al. |
| 2013/0046262 A1 * | 2/2013 | Wang ........................ C08J 5/18 604/370 |
| 2013/0102695 A1 | 4/2013 | Chau |
| 2013/0115396 A1 | 5/2013 | Borchardt |
| 2013/0157032 A1 | 6/2013 | Wang et al. |
| 2013/0333787 A1 | 12/2013 | Shi et al. |

FOREIGN PATENT DOCUMENTS

| | | |
|---|---|---|
| EP | 1102569 B1 | 7/1999 |
| EP | 2572858 A2 | 10/2003 |
| EP | 2285892 B1 | 4/2009 |
| EP | 2297385 B1 | 12/2012 |
| EP | 1939240 | 7/2013 |
| JP | 2006088541 A | 4/2006 |
| JP | 2011042032 | 3/2011 |
| JP | 2011189721 A | 9/2011 |
| WO | WO 9116375 A | 10/1991 |
| WO | WO 9712758 A1 | 4/1997 |
| WO | WO 9112125 A1 | 11/1998 |
| WO | WO 9960973 | 12/1999 |
| WO | WO 0191581 A2 | 12/2001 |
| WO | WO 2008011668 | 1/2008 |
| WO | WO 2010131134 A2 | 11/2010 |
| WO | WO 2011009165 A1 | 1/2011 |
| WO | WO 2012/162136 A2 | 11/2012 |
| WO | WO 2013059401 A1 | 4/2013 |
| WO | WO 2013063310 A1 | 5/2013 |

OTHER PUBLICATIONS

Gail Vance Civille et al, "Development of Terminology to Describe the Handfeel Properties of Paper and Fabrics", Journal of Sensory Studies 5, Feb. 22, 1990, pp. 19-32.

P C Wu et al, "Novel Microporous Films and their Composites", Journal of Engineered Fibers and Fabrics, vol. 2, Issue 1, 2007, pp. 49-59.

L Averous, "Polylactic Acid: Synthesis, Properties and Applications", Monomers, Polymers and Composites from Renewable Resources, Elsevier Science and Technology, Chapter 21, pp. 433-450.

Tianyi Ke et al, "Blending of Poly(lactic acid) and Starches Containing Varying Amylose Content", Journal of Applied Polymer Science, vol. 89, 3639-3646 (2003).

Jun Wuk Park et al, "Biodegradable Polymer Blends of Poly(L-lactic acid) and Gelatinized Starch", Polymer Engineering and Science, Dec. 2000, vol. 40, No. 12, pp. 2539-2550.

T Lim et al., "Processing Technologies for poly(lactic acid)", Progress in Polymer Science 33, (2008), pp. 820-852.

Rahul M Rasal et al., "Poly(lactic acid) modifications", Progress in Polymer Science 35, (2010), pp. 338-356.

K. Madhavan Nampoothiri et al., "An overview of the recent developments in polylactide (PLA) research", Bioresource Technology 101, 2010, pp. 8493-8501.

O Martin et al., "Poly(lactic acid): plasticization and properties of biodegradable multiphase systems", Polymer 42, 2001, pp. 6209-6219.

Luc Averous et al., "Biodegradable Polymers", Environmental Silicate Nano-Biocomposites, Green Energy and Technology, DOI: 10.1007/978-1-4471-4108-2_2, 2012, Chapter 2, pp. 13-39.

Masayuki Shimao, "Biodegradation of plastics", Environmental Biotechnology, pp. 242-247.

Patit P Kundu et al., "Influence of film preparation procedures on the crystallinity, morphology and mechanical properties of LLDPE films", European Polymer Journal 39, 2003 pp. 1585-1593.

D L Green et al., "Three-dimensional pore connectivity in bi-axially stretched microporous composite membranes", Journal of Membrane Science 279, 2006, pp. 100-110.

* cited by examiner

MICROTEXTURED FILMS WITH IMPROVED TACTILE IMPRESSION AND/OR REDUCED NOISE PERCEPTION

FIELD OF THE INVENTION

The present invention relates generally to thermoplastic polymer films having a soft tactile impression and to products comprising such films.

BACKGROUND OF THE INVENTION

Many products today utilize polymeric films in their construction. Some of these products are manufactured on high speed converting lines, and it is desirable for the films that are used to make these products to have good tensile properties. Still further, some of these products utilize films that are touched by a user or disposed adjacent a user's skin such that the perceived softness of the film is an important attribute for the user. Examples of such products include, but are not limited to, absorbent articles such as diapers, training pants, garments (e.g., incontinence, recreational, protective), feminine hygiene products (e.g., sanitary napkins, tampons), medical products (e.g., bandages), towels, wipes, fabrics (e.g., outdoor, recreational, protective), and the like, as well as product packaging (e.g., outer, inner), trash bags, and food bags.

In the manufacture of disposable absorbent articles, such as diapers, polymer films have generally been incorporated into the structure of the article as a part of the layers that are positioned away from the wearer's body during use (often called "the backsheet"). Some disposable diapers are provided with backsheets that provide the appearance of cloth and a cloth-like feel on the outside of the garment such that wearers and care-givers perceive a garment-like comfort. Cloth-like feel and softness are inextricably linked. In addition, the noise a film makes when deformed influences the consumer perception of softness. In general, if a film is quiet, then a consumer may perceive the film as being soft without ever actually having touched the film.

It is believed one of the best examples of a commercially available soft touch film is a tissue over-wrap material from Oji Nepia Co. Go, Tokyo, Japan. However, this film has poor tensile performance, which renders it unacceptable for use in most demanding consumer product applications. It is believed that the film's softness is a result of its highly refined microtexture, which appears to be formed via a cast embossing process. Thermoplastic starch (TPS) blended with polymeric materials are known to introduce microtexture into films (see, e.g., USPN 2012/0009387). Other compositions and/or films incorporating renewable materials are also known in the art (see, e.g., WO2012/162,136, WO 2011/009165, US2012/0022188). It would be desirable to provide a soft touch film that incorporates a renewable material. It would further be desirable to provide a soft touch film incorporating a renewable material and having tensile properties suitable for use in high speed converting operations. Still further, it would be desirable to provide a soft touch film incorporating a renewable material, having tensile properties suitable for use in high speed converting operations, and which can be made using a blown film process, which is simpler and more economical than film casting.

SUMMARY OF THE INVENTION

In one aspect, a film layer having a micro-textured surface is provided. The film layer has a continuous phase with one or more thermoplastic polymers, wherein at least one of the thermoplastic polymers is a low-modulus polymer having a 2% secant modulus of less than or equal to 140 MPa, and the film layer has from 10 wt % to 100 wt % of the low modulus thermoplastic polymer. The film layer also has a discrete phase with from 5 wt % to 45 wt % of a thermoplastic starch.

DETAILED DESCRIPTION

Soft touch films are desired in many applications. While not wishing to be limited by theory, softness is perceived by the skin primarily through the dermal papillae and the associated Meissner's Corpuscles. The Meissner's Corpuscles ("MC") respond to the deformation of the dermal papillae caused by external pressure on the epidermis. The MCs are phasic in nature and only provide a short term response to a given deformation. In order for softness to be perceived, the deformation must be cyclic in nature with repeated application and removal of pressure to the MCs. In practice, such cyclic deformation is achieved by "sliding" the dermal papillae over a patterned surface of protuberances. Softness generally cannot be perceived by application of constant deformation.

In the present films, a microtexture is formed that is inherent to the film itself, rather than formed through a mechanical deformation process such as cast embossing. Creating the microtexture in-situ allows softness to be created in non-embossed films such as blown films. In general, cast film equipment is less flexible and more costly to operate. The films comprise a discrete domain comprising a thermoplastic starch inside a continuous domain of polymer in combination with a low modulus thermoplastic polymer (LMP) and optionally a surface migratory agent (SMA). In some embodiments, the continuous phase comprises further one or more higher modulus thermoplastic polymers, preferably a polyethylene. Surprisingly, it has been discovered that too much thermoplastic starch can create a rough or sandpaper like feeling, which can be mitigated by inclusion of a low modulus polymer and optionally inclusion of the surface migratory agent while too little thermoplastic starch may not create enough surface texture to provide the desired level of softness. It also has been discovered that too much of a low modulus polymer may lead to reduced tensile properties necessary for high speed processing and conversion. The film compositions may be formed into a single or mono-layer film or used to form one or more layers of a multi-layer or laminated film.

I. Definitions

As used herein, the following terms shall have the meanings specified thereafter:

As used herein, the term "absorbent article" means any absorbent consumer product or portion thereof, including absorbent personal hygiene articles (e.g., wipes, diapers, diaper components such as a backsheets or portion of a backsheet, training pants, absorbent underpants, adult incontinence products, feminine hygiene products such as pads and tampons; coverings (e.g., floor coverings, table cloths, picnic area covers); medical products (e.g., surgical gowns and drapes, face masks, head coverings, shoe coverings, wound dressings, bandages, sterilization wraps, and the like for medical, dental or veterinary applications); and garments (any type of apparel which may be worn, e.g., industrial work wear and coveralls, undergarments, pants, shirts, jackets, gloves, socks, head coverings, shoe coverings, aprons, surgical clothing, and the like).

"Copolymer" refers to a polymer derived from two or more polymerizable monomers. When used in generic terms the term "copolymer" is also inclusive of more than two distinct monomers, for example, ter-polymers. The term "copolymer" is also inclusive of random copolymers, block copolymers, and graft copolymers.

As used herein, the terms "copolymer" and "polymer" are inclusive of homo-polymers and copolymers that can exhibit both homogeneous and heterogeneous morphologies.

"Compatibilizer" means a polymeric additive that, when added to a blend of immiscible polymers, modifies their interfaces and stabilizes the blend's morphology (e.g., increases the interfacial adhesion between phases).

"Contiguous" means in direct contact with. Where a layer is "contiguous," it is in direct contact with at least one adjacent layer.

A "continuous phase" is a phase domain consisting of essentially a single phase in a heterogeneous mixture through which a continuous path to all phase domain boundaries may be drawn without crossing a phase domain boundary. For example, in a polymer blend, a continuous immiscible polymer phase is essentially a network of interconnected domains.

A "compatibilized" polymer blend is an otherwise immiscible blend where the interfacial tension between phase boundaries has been reduced (e.g., through the addition of a compatibilizing polymer) such that the phases can form a substantially macroscopically homogenous mixture upon cooling, and the blend generally exhibits macroscopically uniform physical properties throughout its entire volume.

As used herein, the term "cross machine direction" or CD means the width of film, i.e. a direction generally perpendicular to the MD.

A "discontinuous" or "discrete" or "dispersed" phase domain is a phase-domain in a phase-separated mixture that is surrounded by a continuous phase but isolated from all other similar phase domains within the mixture.

"Film" refers to a sheet-like material wherein the length and width of the material far exceed the thickness of the material. As used herein, the terms "film" and "sheet" are used interchangeably.

As used herein, the term "machine direction" or MD means the length of film as it is produced.

As used herein, "matrix polymer" or "matrix polymer composition" means a polymer used to dilute a masterbatch.

As used herein, "masterbatch" or "masterbatch composition" means a polymer composition pre-mix and/or concentrate. Articles can be formed either from the masterbatch composition or from a melt-mixture of the masterbatch composition with a matrix polymer.

"Morphology" of a polymer blend describes the structures and shapes observed, such as by microscopy, of the different phase domains present within the composition.

"Heterophasic" describes the morphology of an immiscible polymer system where a discrete minor phase polymer is dispersed throughout a continuous major phase.

"No embossing" means the total absence of embossing on the referenced surface.

"Non-embossed" means no embossing, or substantially no embossing, is present on the referenced surface.

A "phase domain" or "phase" is a region of a material that is uniform in chemical composition and physical state.

"Renewable" refers to a material that can be produced or is derivable from a natural source which is periodically (e.g., annually or perennially) replenished through the actions of plants of terrestrial, aquatic or oceanic ecosystems (e.g., agricultural crops, edible and non-edible grasses, forest products, seaweed, or algae), or microorganisms (e.g., bacteria, fungi, or yeast).

"Substantially no embossing" means only minor embossing that does not substantially affect the softness/feel of the referenced surface. Substantially no embossing is broad enough to also encompass "no embossing".

As used herein, the terms "substantially no", "substantially free of", and/or "substantially free from" mean that the indicated material is at the very minimum not deliberately added to the composition to form part of it, or, most desirably, is not present at analytically detectable levels. It is meant to include compositions whereby the indicated material is present only as an impurity in one of the other materials deliberately included. In some instances, substantially free of means less than 0.5 wt %, 0.25 wt %, 0.1 wt % or 0.05 wt %.

As used herein, articles such as "a" and "an" are understood to mean one or more of what is claimed or described.

As used herein, the terms "include", "contain", and "has", as well as their various verb tenses, are meant to be non-limiting.

All percentages and ratios are calculated by weight of the total composition, unless otherwise indicated.

Unless otherwise noted, all component or composition levels are in reference to the active portion of that component or composition, and are exclusive of impurities, for example, residual solvents or by-products, which may be present in commercially available sources of such components or compositions.

II. Soft Touch Film Compositions

Figure 1:
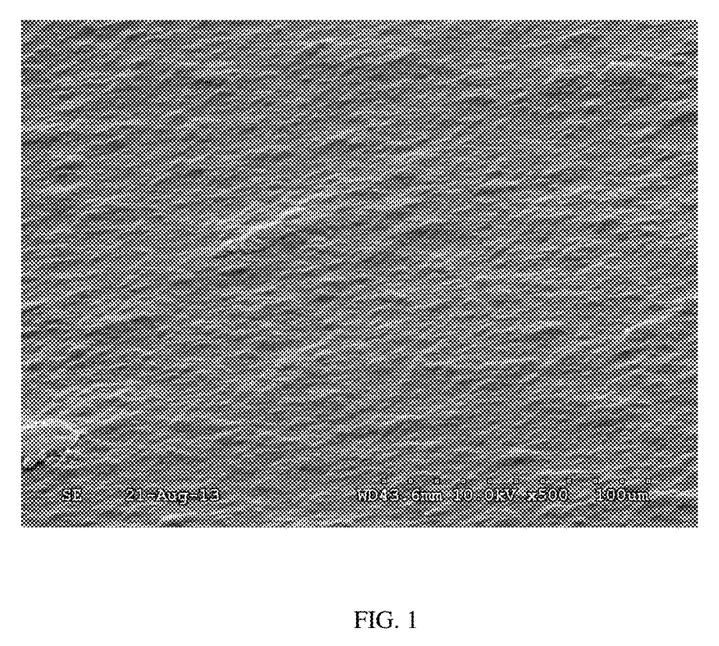
FIG. 1 is a photomicrograph of an outer surface of a soft touch film.
Figure 2:
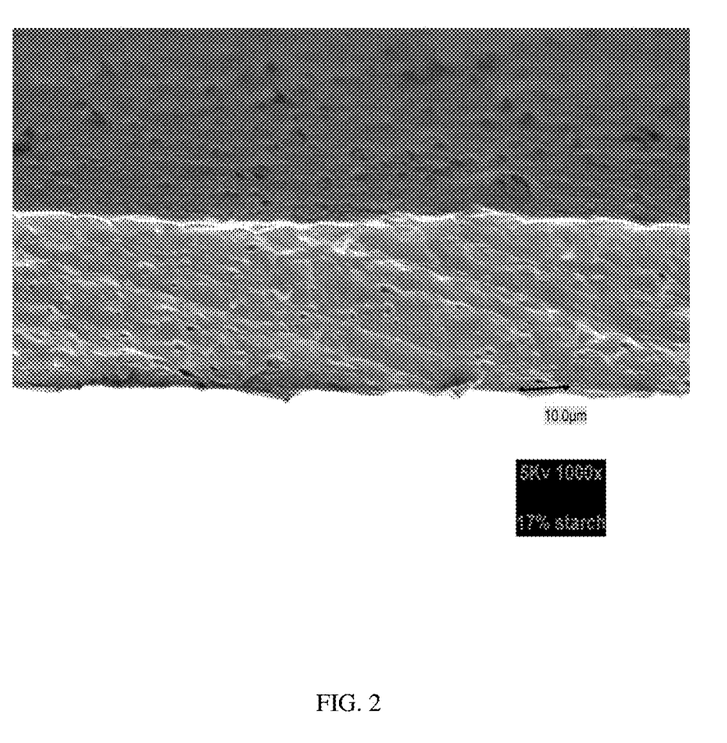
FIG. 2 is cross-sectional photomicrograph of a soft touch film.

The soft touch film compositions comprise a continuous phase and a discrete phase. One non-limiting example of a microtextured film surface formed from the film compositions described herein is shown in FIG. 1. A cross-section of another sample of such a film is shown in FIG. 2, wherein some of the discrete phase domains are visible. The discrete phase comprises a thermoplastic starch, and the continuous phase comprises one or more thermoplastic polymers, one of which is a low modulus polymer, and optionally a surface migratory agent.

A. Discrete Phase Comprising Thermoplastic Starch

The discrete phase comprises a thermoplastic starch, which may be added as a master batch comprising the thermoplastic starch and other ingredients. The soft touch film composition may comprise from about 5 wt % to about 45 wt %, preferably about 5 wt % to about 25 wt %, or more preferably about 10 wt % to about 25 wt % of a thermoplastic starch. The weight percentages given for thermoplastic starch refer to the combination of the starch and its plasticizer.

As used herein, "thermoplastic starch" or "TPS" means a native starch or a starch derivative that has been rendered destructured and thermoplastic by treatment with one or more plasticizers, with at least one starch plasticizer still remaining. Thermoplastic starch compositions are well known and disclosed in several patents, for example: U.S. Pat. Nos. 5,280,055; 5,314,934; 5,362,777; 5,844,023; 6,214,907; 6,242,102; 6,096,809; 6,218,321; 6,235,815; 6,235,816; and 6,231,970.

Since natural starch generally has a granular structure, it needs to be destructurized before it can be melt processed like a thermoplastic material. For gelatinization, e.g., the process of destructuring the starch, the starch can be destructurized in the presence of a solvent which acts as a plasticizer. The solvent and starch mixture is heated, typically under pressurized conditions and shear to accelerate the gelatinization process. Chemical or enzymatic agents may also be used to destructurize, oxidize, or derivatize the starch. Commonly, starch is destructured by dissolving the starch in water. Fully destructured starch results when the particle size of any remaining undestructured starch does not impact the extrusion process. Any remaining undestructured starch particle sizes are typically less than 30µ (by number average), commonly less 15µ more commonly less than 5µ or less than 2µ. The residual particle size can be determined by pressing the final formulation into a thin film (50µ or less) and placing the film into a light microscope under cross polarized light. Under cross polarized light, the signature Maltese cross, indicative of undestructured starch, can be observed. An alternative process for measuring the amount and size of undestructured starch is by means of a melt filtration test in which a composition containing the starch is passed through a series of screens that can capture residual undestructured starch.

Suitable naturally occurring starches include, but are not limited to, corn starch, potato starch, sweet potato starch, wheat starch, sago palm starch, tapioca starch, rice starch, soybean starch, arrow root starch, bracken starch, lotus starch, cassava starch, waxy maize starch, high amylose corn starch, and commercial amylose powder. Blends of starch may also be used. Most starch is extracted from cereals (e.g., wheat, corn, rice) and from tubers (e.g., potatoes), and is the main plant energy reserve. Though many starches are useful herein, natural starches derived from agricultural sources offer the advantages of being abundant in supply, easily replenishable, and inexpensive in price. Naturally occurring starches, particularly corn starch, wheat starch, and waxy maize starch, can be the starch polymers of choice due to their economy and availability.

Modified starch may also be used. Modified starch is defined as non-substituted or substituted starch that has had its native molecular weight characteristics changed (i.e., the molecular weight is changed but no other changes are necessarily made to the starch). If modified starch is desired, chemical modifications of starch may typically include acid or alkali hydrolysis and oxidative chain scission to reduce molecular weight and molecular weight distribution. Natural, unmodified starch generally has a very high average molecular weight and a broad molecular weight distribution (e.g. natural corn starch has an average molecular weight of up to 60/000,000 grams/mole (g/mol)). The average molecular weight of starch can be reduced to the desirable range by acidic reduction, oxidative reduction, enzymatic reduction, hydrolysis (acid or alkaline catalyzed), physical/mechanical degradation (e.g., via the thermomechanical energy input of the processing equipment), or combinations thereof. The thermomechanical method and the oxidative method offer an additional advantage when carried out in situ. The exact chemical nature of the starch and molecular weight reduction method are not critical.

A plasticizer can be used to destructurize the starch and enable the starch to flow (i.e., create a thermoplastic starch). The same plasticizer may be used to increase melt processability or two separate plasticizers may be used. Non-limiting examples of useful hydroxyl plasticizers include sugars such as glucose, sucrose, fructose, raffinose, maltodextrose, galactose, xylose, maltose, lactose, mannose, erythrose, glycerol, and pentaerythritol; sugar alcohols such as erythritol, xylitol, malitol, mannitol and sorbitol; polyols such as ethylene glycol, propylene glycol, dipropylene glycol, butylene glycol, hexane triol, and the like, and polymers thereof; and mixtures thereof. Also suitable for use herein are hydrogen bond forming organic compounds which do not have hydroxyl groups, including poloxomers, poloxamines, urea and urea derivatives; anhydrides of sugar alcohols such as sorbitan; animal proteins such as gelatin; vegetable proteins such as sunflower protein, soybean proteins, cotton seed proteins; and mixtures thereof. Other suitable plasticizers are phthalate esters, dimethyl- and diethyl-succinate and related esters, glycerol triacetate, glycerol mono- and di-acetates, glycerol mono-, di-, and tri-propionates, and butanoates, which are biodegradable. Aliphatic acids such as ethylene acrylic acid, ethylene maleic acid, butadiene acrylic acid, butadiene maleic acid, propylene acrylic acid, propylene maleic acid, and other hydrocarbon based acids. All of the plasticizers may be used alone or in mixtures thereof.

Common plasticizers include glycerin, mannitol, and sorbitol, with sorbitol being the most common. The amount of plasticizer is dependent upon the molecular weight, amount of starch, and the affinity of the plasticizer for the starch. Generally, the amount of plasticizer increases with increasing molecular weight of starch.

In some instances, the thermoplastic starch may be added as a masterbatch composition that comprises the starch, plasticizer(s), and other polymers and materials. In one embodiment, the masterbatch may comprise cornstarch, glycerol, sorbitol, ethylene acrylic acid, very low density polyethylene, low density polyethylene, stearic acid and/or calcium stearate. In one embodiment, the masterbatch composition comprises from 50 wt % to 80 wt % of a thermoplastic starch by weight of the TPS masterbatch composition (with the plasticizer content being from 5 wt % to 50 wt % of the thermoplastic starch), from 5 wt % to 25 wt % of a very low density polyethylene by weight of the masterbatch composition, from 5 wt % to 25 wt % of an ethylene acrylic acid by weight of the masterbatch composition, and from 5 wt % to 20 wt % of a low density polyethylene by weight of the masterbatch composition. A particularly preferred masterbatch composition comprises cornstarch (about 50 wt %), glycerol (about 10 wt %), sorbitol (about 5 wt %), ethylene acrylic acid (about 10 wt %), very low density polyethylene (about 10 wt %), low density polyethylene (about 14 wt %), and other process aids/fillers (about 1 wt %). Similar TPS masterbatch compositions are available from Cardia Bioplastics, Inc. (USA) under the designation BLF-02 and is believed further in US 2012/0222188.

Without intending to be bound by any theory, it is believed that the thermoplastic starch enables, at least in part, the in situ formation of the microtextured surface during processing such that mechanical embossing is not required. The microtexture itself is partially represented by the TPS discrete domain that has slightly protruded from the film surface. In some embodiments, the microtextured surface of the soft touch film is substantially free of mechanical embossing and is formed via a film blowing operation. This does not preclude either embossing to add further texture or the use of a cast embossing process with the film compositions described herein.

Granular starches are not preferred for inclusion as a discrete phase material due to their large size and high stiffness. When utilized as the heterophasic inclusions, granular starches typically produce microtexture with a size scale (Ra)>about 20 microns, which creates a harsh feeling and "sandpaper" like surface. In addition, the tensile properties are compromised due to the incorporation of large defects represented by the granular starch domains. Hence, TPS, which has been sufficiently destructured and plasticized, represents an ideal discrete phase material. Complete starch destructuring may not be necessary but complete granularity is likely not acceptable. Desctructruing of starch typically is done in a twin-screw extruder or batch kneading process. Typically, the TPS is blended with compatibilizers and bulk continuous phase compatible polymer to produce a masterbatch.

It is believed that the amount of TPS can affect tactile impression. It appears that as TPS concentration increases, softness improves to a point after which softness begins to drop. At TPS concentrations that are too high, a "sandpaper" like feel becomes apparent. The effect of adding too much TPS to a polyethylene film is illustrated by Comparative Examples #4 and #5 in Table 2. An expert panel rated the softness of Comparative Example #4 (17 wt % TPS) at 4.9 on a scale of 1 to 10 (10 being most soft) and noise perception as 7.0 on a scale of 1 to 10 (10 being the loudest). The same expert panel rated the softness of Comparative Example #5 (47 wt % TPS) as 3.5 and noise perception as 6.5.

B. Continuous Phase Thermoplastic Polymers

The continuous phase comprises one or more low modulus thermoplastic polymers. In some embodiments, the continuous phase may further comprise one or more higher modulus thermoplastic polymers. When a higher modulus thermoplastic polymer is included, the low modulus thermoplastic should be melt-miscible with the higher modulus thermoplastic polymer.

Low Modulus Thermoplastic Polymers

Surprisingly, it has been found that film compositions comprising a low modulus thermoplastic polymer and/or a surface migratory agent can counteract, to a point, the negative effect on softness of increasing TPS concentrations too much. Without intending to be bound by any theory, it is believed that softness can be maintained by increasing the concentration of a low modulus thermoplastic polymer and/or surface migratory agent as the concentration of thermoplastic starch is increased. Including a sufficient amount of a low modulus polymer appears to enable further increases in the concentration of TPS (thereby providing more renewable content in the film composition) while maintaining a given level of softness. However, even with the use of a low modulus polymer and/or surface migratory agent, it has been found that a deterioration in mechanical properties (e.g., 2% secant modulus and/or ultimate strength) can occur with increasing concentrations of a low modulus polymer. For consumer products requiring high speed converting operations in their manufacture, such as diapers and feminine hygiene articles, it has been discovered there is a balance between TPS concentration (to provide a microtexture improving softness), concentration of low modulus thermoplastic polymer (to improve softness but not too much as to compromise mechanical strength), and concentration of surface migratory agent (to improve softness but not compromise mechanical strength).

The soft touch film compositions comprise less than 90 wt %, or from 20 wt % to 90 wt %, or from 20 wt % to 40 wt %, or from 20 wt % to 35 wt % of one or more low-modulus thermoplastic polymers. The low modulus thermoplastic polymer may have a 2% secant modulus of less than or equal to 140 MPa, or from 30 MPa to 140 MPa, or from 30 MPa to 75 MPa. In some instances, the low modulus thermoplastic polymer may have a density less than 0.915 g/cm$^3$ or from 0.85 g/cm$^3$ to 0.915 g/cm$^3$. The thermoplastic starch masterbatch, if used, may comprise some of the low modulus thermoplastic polymer to aid in low temperature processing of the TPS.

Some examples of low modulus thermoplastic polymers are very low density polyethylene (VLDPE) or ultra low density polyethylene (ULDPE), plastomers (e.g., ATTANE™ 4404G available from available from the Dow Chemical Co.), and polyolefin elastomers, which are generally copolymers of ethylene and one or more alpha-olefins such as 1-butene, 1-hexene, and 1-octene. The low modulus thermoplastic polymer may generally have a melt index at 190° C. from about 0.5 g/10 minutes to about 20 g/10 minutes at an applied load (force) of 2.16 kg. Some examples of suitable low modulus thermoplastic polymers that may be used include, but are not limited to, a ethylene/octene copolymer having a density of about 0.904 g/cm$^3$ and a melt index at 190° C. of about 4 g/10 minutes at an applied load of 2.16 kg, and ethylene/butene copolymer having a density of about 0.884 g/cm$^3$ and a melt index at 190° C. of about 0.7 g/10 minutes at an applied load of 2.16 kg, and an ethylene/butene copolymer having a density of about 0.8985 and melt index at 190° C. of about 5 g/10 min at an applied load of 2.16 kg. Reference herein to a density or melt index of a polyethylene polymer is intended to mean a density or melt index determined in accordance with ASTM D792 and ASTM D 1238, respectively.

The effect of adding a low modulus polymer to a TPS containing film composition is illustrated by Comparative Example #4 (17 wt % TPS, 2.5 wt % low modulus thermoplastic polymer), Example #1 (17 wt % TPS, 22.5 wt % low modulus thermoplastic polymer) and Example #3 (17 wt % TPS, 72.5 wt % low modulus thermoplastic polymer). An expert panel rated the softness of Comparative Example #4 as 4.9 and Example #1 as 6.0, which illustrates a softness improvement by increasing the wt % of low modulus thermoplastic polymer, although there was a noticeable drop in 2% secant modulus. The expert panel rated the softness of Example #1 as 6.0 and Example #3 as 7.9, which again illustrates the trend of a softness improvement by increasing the wt % of low modulus thermoplastic polymer. However, the ultimate strength and 2% secant modulus both dropped significantly for Example #3 to values that would be undesirable for film compositions used in high speed converting operations.

Higher Modulus Thermoplastic Polymers

The continuous phase also may comprise one or more higher modulus thermoplastic polymers. The one or more higher modulus thermoplastic polymers may have a 2% secant modulus greater than 140 MPa, greater than 160 MPa, or greater than 180 MPa, or from 140 MPa to 700 MPa. The one or more higher modulus thermoplastic polymers may have a combined concentration less than 70% by weight of the soft touch film composition, or from 0 wt % to 70 wt %, or from 30 wt % to 70 wt %, or from 30 wt % to 60 wt %, or from 30 wt % to 50 wt % by weight of the film composition.

If the higher modulus thermoplastic polymers are polyethylene or co-polyethylene, these may have a density greater than 0.915 g/cm$^3$ or from 0.915 g/cm$^3$ to 0.970 g/cm$^3$. In some embodiments, the one or more higher modulus thermoplastic polymers are a polyethylene, such as low density polyethylene (LDPE), linear low density polyethylene (LLDPE) which may have a density ranging from 0.915 g/cm$^3$ to 0.925 g/cm$^3$, linear medium density polyethylene (LMDPE) or medium density polyethylene (MDPE) which may have a density ranging from 0.926 g/cm$^3$ to 0.94 g/cm$^3$, and/or high density polyethylene (HDPE) which may have a density of greater or equal to 0.941 g/cm³ up to 0.97 g/cm³ or more. Suitable grades of LDPE include, but are not limited to, those having a melt index at 190° C. of about 0.2 g/10 min to about 7 g/10 min at a load of 2.16 kg. In some embodiments, the continuous phase of the soft touch film composition comprises a combination of LLDPE and LDPE or MDPE, some examples of which are available from Baskem as SLH218 (LLDPE), from Exxon Mobil (LDPE), from the Dow Chemical Co, as DOWLEX™ 2045 (oLLDPE) and from the Dow Chemical Co. as DOWLEX™ 2027 (LMDPE).

Surface Migratory Agents ("SMAs")

The soft touch film composition may optionally comprise one or more surface migratory agents. In some embodiments, the surface migratory agent may be an unsaturated long-chain carboxylic acid amide, such as those selected from erucamide, oleamide, derivatives thereof, and combinations thereof. The SMA may be added to the film composition as a masterbatch composition, wherein the SMA is blended with other materials (e.g., LLPE or LDPE) to form the masterbatch composition, typically at 1 wt % to 10 wt % of the SMA by weight of the masterbatch composition. The soft film compositions may comprise from 0.05 wt % to 0.5 wt %, or from 0.1 wt % to 0.3 wt %, of a SMA by weight of the film composition.

Examples #2 (17 wt % TPS, 32.5 wt % low modulus thermoplastic polymer, 0 wt % SMA), #5 (17 wt % TPS, 32.5 wt % low modulus thermoplastic polymer, 0.05 wt % SMA), #6 (17 wt % TPS, 32.5 wt % very low modulus thermoplastic polymer, 0.275 wt % SMA), #7 (17 wt % TPS, 32.5 wt % low modulus thermoplastic polymer, 0.55 wt % SMA), and #8 (17 wt % TPS, 30 wt % low modulus thermoplastic polymer, 2.2 wt % SMA) illustrate the effect of adding a SMA to the film compositions. An expert panel rated the softness of Example #2 at 6.0 compared to 6.3 for Example #5 and 6.7 for Example #6, which illustrates an increasing perception of softness as the SMA concentration increases. The same trend is evident when comparing Examples #7 and #8 (softness rating of 6.8 v. 7.6, respectively). Notably, the expert panel rated the softness of Examples #4 (39 wt % TPS, 36 wt % low modulus thermoplastic polymer, 0.275 wt % SMA) and #6 (17 wt % TPS, 32.5 wt % low modulus thermoplastic polymer, 0.275 wt % SMA) similarly (softness rating of 7.0 v 6.7, respectively) at the same concentration of SMA but very different concentrations of TPS. Thus, it appears that a sufficient concentration of very low modulus thermoplastic polymer and SMA can overcome the sandpaper feel of high concentrations of TPS (cf, Comparative Example #5 and Example #4), albeit with reduced mechanical properties that are less suited for use in certain consumer products Surprisingly, it has been discovered that film compositions comprising combinations of a thermoplastic starch, a low modulus thermoplastic polymer, and a SMA can provide a synergistic combination of softness and mechanical strength suitable for use in consumer products manufactured using high speed converting operations and where softness in the end product is desired. Based on the trends illustrated in Table 2, it is believed that, for a mono-layer film, the film composition preferably comprises from 5 wt % to 45 wt %, or more preferably 5 wt % to 25 wt %, most preferably 10 wt % to 25 wt % of a TPS in combination with 20 wt % to 90 wt %, more preferably from 20 wt % to 40 wt %, most preferably from 20 wt % to 35 wt % of a low modulus thermoplastic polymer in combination with 0.05 wt % to 0.5 wt %, more preferably 0.1 wt % to 0.3 wt %, of a SMA where it is desired to provide good softness and/or an ultimate strength (of the mono or multilayer film) in the MD and/or CD directions greater than about 20 MPa, preferably greater than about 25 MPa, more preferably greater than about 30 MPa and/or a 2% secant modulus in the MD and/or CD directions greater than about 120 MPa, preferably greater than 140 MPa, more preferably greater than 160 MPa, and most preferably greater than about 180 MPa. In product applications where less mechanical strength is acceptable, broader concentrations than set forth above would be acceptable.

Suitable SMAs include aliphatic acid amides including primary and secondary amides, aliphatic acid esters, waxes, hydrogenated soy bean oil (HSBO), hydrogenated castor oil (HCO), tristearin, silicone oils, metal soaps, and combinations thereof. The SMA is typically a long-chain fatty acid, long-chain fatty acid amide, such as a primary mono-unsaturated long-chain carboxylic acid, or a primary mono-unsaturated long-chain carboxylic acid amide. As used herein, "long chain" means chain length of 18-22 carbon atoms. Useful long-chain fatty acid amides include those comprising or selected from the group consisting of erucamide, oleamide, derivatives thereof, and combinations thereof. Erucamide is the amide of $C_{22}$ mono-unsaturated erucic acid, while oleamide is derived from mono-unsaturated $C_{18}$ oleic acid. Erucamide derivatives that can be useful include those such as N-steryl-erucamide.

Some SMAs are solid at room temperature (25° C.). SMAs are generally miscible or compatible with the bulk polymer in the molten state. The SMA is combined with the continuous phase polymer and the other ingredients in a molten state, for example while in the extruder. As the mixture leaves the die and changes from a liquid to a solid, the SMA begins to migrate (i.e., exude, bloom) from the bulk to the surface of the film. Migration occurs because the SMA has a limited solubility in the matrix. During processing the SMA is solubilized in the amorphous melt, but as the film cools and begins to crystallize, the SMA is squeezed out of the solidifying polymer matrix. Once on the surface, the SMA adds to the film surface microtexture.

Compatibilizers

The soft touch film compositions may comprise one or more compatibilizers, which may be part of the thermoplastic starch masterbatch or added to the film composition separately. To improve the compatibility and adhesion of incompatible polymer blends, any suitable compatibilizer may be incorporated. For example, in one aspect where the incompatible polymers are polar TPS and non-polar polyethylene, suitable compatibilizers can be polymers or copolymers having functional groups that present specific interactions with starch molecules and/or are capable of undergoing chemical reactions with starch functional groups to result in a polar interaction or a covalent bond. Many of these compatibilizers have low interfacial tension and/or a partial or full miscibility with the polyolefin. Examples of functional groups that present specific interactions and/or are capable of reacting with starch are: hydroxyl, carboxyl or carboxylate, tertiary amino and/or quaternary ammonium, sulfoxyl and/or sulfoxylate groups, and vinyl pyrrolidone copolymers.

In one aspect, a compatibilizer having hydroxyl groups is a polymer containing vinyl alcohol units. For example, such compatibilizer can be a poly (vinyl ester) wherein the ester groups are partially hydrolyzed or a copolymer containing vinyl alcohol units as well as other units such as are obtained by copolymerization of vinyl esters, commonly vinyl acetate, with monomers such as ethylene (EVOH), propylene, vinyl chloride, vinyl ethers, acrylonitrile, acrylamide, omega-octadecene, vinyl-butyl ether, vinyl-octadecyl ether, vinyl pyrrolidone and other known monomers, with subsequent hydrolysis of at least some of the vinyl-ester groups. Typical copolymers include, for example, poly (vinyl alcohol-co-vinyl-acetate); ethylene/vinyl alcohol/vinyl acetate copolymers; ethylene/vinyl chloride/vinyl alcohol/vinyl acetate graft copolymers; vinyl alcohol/vinyl acetate/vinyl chloride copolymers; vinyl alcohol/vinyl acetate/vinyl chloride/diacryl amide copolymers; vinyl alcohol/vinyl butyral copolymers; vinyl alcohol/vinyl acetate/vinyl pyrrolidone copolymers; vinyl alcohol/styrene copolymers.

In one aspect, a compatibilizer containing carboxylic acid and/or carboxylate groups is a synthetic polymer, such as a copolymer containing carboxylate groups as well as other units such as are obtained by copolymerization of acrylic acid, methacrylic acid, crotonic acid, maleic acid, itaconic acid, e.g., in their acid or carboxylate form, with monomers such as ethylene, vinyl chloride, vinyl esters such as vinyl acetate, vinyl ethers, acrylic acid esters, acrylonitrile, methacrylic acid esters, maleic acid esters, acrylamide, omega-octadecene, vinyl-butyl ether, vinyl pyrrolidone and other known monomers. If a carboxyl group-containing monomer is used, then at least a part of the carboxyl groups are typically neutralized with a cation.

Copolymers containing carboxylate groups include those which can be described as being derived from acrylic acid, methacrylic acid, crotonic acid, maleic acid, itaconic acid, methylacrylate, methylmethacrylate, acrylamide, acrylonitrile and/or methylvinylether. Other polymers are those that can be described as being derived from acrylic acid, methacrylic acid, maleic acid, methacrylate, ethyl acrylate and/or methylvinylether. Such copolymers may be also copolymerized with ethylene, propylene, or styrene.

Such copolymers include, e.g., poly (acrylic acid-co-vinyl acetate); ethylene/acrylic acid/vinyl acetate copolymers; ethylene/vinyl chloride/acrylic acid/vinyl acetate graft copolymers; acrylic acid/vinyl acetate/vinyl chloride copolymers; acrylic acid/vinyl methylether copolymers; vinyl acetate/acrylic acid/acrylic acid methylester copolymer; vinyl acetate/crotonic acid copolymers; vinyl acetate/maleic acid copolymers; methacrylic acid/vinyl acetate/vinyl pyrrolidone copolymers; acrylic acid/acrylonitrile copolymer; ethylene/propylene/acrylic acid copolymer; and styrene/acrylic acid copolymer, wherein a part or all of the acid groups are present in their carboxylate form. Copolymers that contain carboxylic groups are typically copolymers of acids with ethylene, e.g. the ethylene-acrylic-acid copolymer in the form of its salt or an ethylene-methacrylic acid copolymer in the form of its salt.

Compatibilizers which contain tertiary amino groups and/or salts thereof and/or quaternary ammonium groups are typically a synthetic polymer, as obtained by the polymerization of monomers containing tertiary amino groups and/or salts thereof and/or quaternary amino groups such as poly (2-vinyl pyridine); poly (4-vinyl pyridine); polyvinyl carbazole, 1-vinyl imidazole and/or salts thereof and/or their quaternized derivatives as well as with other polymers as are obtained by copolymerization of such amines with other monomers such as acrylonitrile, butyl methacrylate, styrene and other known monomers. The expression amine salts includes the salts formed with an inorganic or organic acid, e.g. salts with inorganic or organic acids such as HCl, $H_2SO_4$, and acetic acid. The expressions "quaternized derivative" and "quaternary ammonium groups" mean quaternized derivatives of tertiary amines, e.g. quaternized with an alkyl halide such as methyl chloride. Examples include those derived from 2-vinyl-pyridine, 4-vinyl pyridine and vinyl carbazole.

Compatibilizers having sulfonic acid and/or sulfonate functional groups are typically styrene sulfonic acid polymers, styrene sulfonic acid copolymers, and salts thereof. In some aspects, they are block copolymers of sulfonated styrene with unsaturated monomers such as ethylene, propylene, butylene, isobutylene, butadiene, isoprene, and/or styrene. Salts thereof include the corresponding sulfonates and their salts with metal ions or ammonium ions, for instance alkali metal ions, magnesium, zinc, $NH_4+$, sodium, or potassium. In one aspect, the sodium salt is used.

Compatibilizers containing vinyl pyrrolidone are typically copolymers of vinyl pyrrolidone with one or more monomers selected from the group of vinyl esters, vinyl alcohol, allyl alcohol, ethylene, propylene, butylene, isoprene, butadiene, styrene, vinyl ethers, dimethylaminoethyl, methacrylate, and combinations thereof. Typical copolymers of vinyl pyrrolidone with a monomer can be selected from the group consisting of vinyl esters, vinyl alcohol, styrene, dimethylaminoethyl methacrylate, and combinations thereof. Also included are the poly (N-vinyl pyrrolidone-vinyl ester) copolymers and the poly (N-vinyl pyrrolidone-vinyl acetate) copolymers.

Suitable compatibilizers include polar homopolymers and copolymers. This class may include homopolymers inherently compatible with both immiscible thermoplastic polymers. For example, where the immiscible polymers are TPS and a polyolefin, the compatibilizer may include aliphatic polyesters synthesized from ring-opening polymerizations of lactones or lactides such as polycaprolactone. These materials are unique because they are polar but can have favorable interactions with polyolefins. Polycaprolactone is one example. The material is polar but is known in the art to be melt processable and compatible with polyolefins. Other compatibilizers in this class include aliphatic polyamides synthesized from ring-opening polymerizations such a polycaprolactam and polylaurylactam.

Suitable compatibilizers also include block copolymers of inherently polar monomers such as amides and ethers. These include amide-ether block copolymers such as polycaprolactam block ether (Pebax MH1657) and polylaurylactam block ether (Pebax MV1074). Other example compatibilizers of the present class include aliphatic polyesters obtained from reactions of hydroxyacids having two or more carbon atoms (such as lactones or lactides) and diols such as butanediol. Examples include polybutylene succinate.

In some aspects, the efficacy of the polar homopolymers and copolymers can be further improved with addition of typical polyethylene type compatibilizers (5:1 ratio of concentration of compatibilizers of the present class to the typical polyethylene polar copolymer type). For example, the efficacy of the amide-ether block copolymer compatibilizers can be greatly enhanced by combination with polyethylene-acrylic ester-maleic anhydride terpolymer in a 5:1 or less ratio.

Another class of compatibilizers suitable for use includes non-polymeric materials with both polar and non-polar functionality. The compatibilizers can be non-polymeric materials (e.g., surfactants) containing both polar and non-polar functionalities; these can include fatty acid soaps, waxes, oils, and/or greases. Examples include: lipids, epoxidized lipids, castor oil, hydrogenated castor oil, and ethoxylated castor oil. For instance, the oil, wax, or combination thereof can comprise a mineral oil or wax, such as a linear alkane, a branched alkane, or combinations thereof. The oil, wax, or combination thereof can be selected from the group consisting of soy bean oil, epoxidized soy bean oil, maleated soy bean oil, corn oil, cottonseed oil, canola oil, beef tallow, castor oil, coconut, coconut seed oil, corn germ oil, fish oil, linseed oil, olive oil, oiticica oil, palm kernel oil, palm oil, palm seed oil, peanut oil, rapeseed oil, safflower, sperm oil, sunflower seed oil, tall oil, tung oil, whale oil, tristearin, triolein, tripalmitin, 1,2-dipalmitoolein, 1,3-dipalmitoolein, 1-palmito-3-stearo-2-olein, 1-palmito-2-stearo-3-olein, 2-palmito-1-stearo-3-olein, trilinolein, 1,2-dipalmitolinolein, 1-palmito-dilinolein, 1-stearo-dilinolein, 1,2-diacetopalmitin, 1,2-distearo-olein, 1,3-distearo-olein, trimyristin, trilaurin, capric acid, caproic acid, caprylic acid, lauric acid, lauroleic acid, linoleic acid, linolenic acid, myristic acid, myristoleic acid, oleic acid, palmitic acid, palmitoleic acid, stearic acid, and combinations thereof.

Still yet another class of compatibilizers suitable for use include low molecular weight materials with both polar and non-polar functionality. This class of compatibilizers includes oxidized waxes such as oxidized, low molecular weight polyethylene, having a weight average molecular weight of less than 10,000 Daltons, or less than 5,000 Daltons, and in a particular aspect from 60 to 10,000 Daltons. Examples include oxidized polyethylene wax under the trade name KGT 4, available from Jingjiang Concord Plastics Technology Co., Ltd. (Jiangsu, China); AC 316, AC330, and AC395 available from Honeywell Performance Additives, Morristown, N.J., USA; and Epolene™ Series from Westlake Plastics, Houston, Tex., USA.

Still yet another class of suitable compatibilizers includes bulk phase/in-situ compatibilzers that are formed in-situ by modifying the bulk phase to be inherently more polar such as through oxidation. For example, in the case of polyolefin, this type of compatibilization is characterized by the polar functionality being present on the predominance of polyolefin chains representing the bulk phase, which is unlike traditional compatibilizers with polar functionality where only a minority of the chains in the bulk polyolefin phase actually contain polar functionality. In some aspects where the polyolefin is modified to function as a compatibilizer, the amount of compatibilizer (i.e., modified pololefin) can range from 1% to 100%, or from 1% to 95%, or from 55% to 95%, by weight, of the compatibilizer layer.

The modification can be accomplished in a number of ways including peroxide modification, plasma modification, corona modification, and grafting such as anhydride functionality. The modification can also be accomplished by not preventing oxidation through reduced or eliminated usage of anti-oxidants in the various melt processing steps. The bulk polyolefin phase can be oxidized or modified off-line with known methods in the art as referenced in U.S. Pat. Nos. 5,401,811; 3,322,711 issued May 1967 to Bush et al.; U.S. Pat. No. 4,459,388 issued July 1984 to Hettche et al.; U.S. Pat. No. 4,889,847 issued December 1989 to Schuster et al.; and U.S. Pat. No. 5,064,908 issued November 1991 to Schuster et al.

Further, post-reactor grafting of maleic anhydride to bulk polyolefin can result in an aspect where the grafting per polymer chain is low but overall polar functionality remains sufficient. As disclosed by "Functionalized Polyolefins: Compatibiliser & Coupling Agents for Alloys, Blends & Composites (Devendra Jain), maleic anhydride is reactively grafted after the primary polyolefin is produced. This can be accomplished in the extrusion step where the bulk polyolefin and TPS are combined or formed into a film.

Additionally, low concentrations of dicumyl peroxide can modify the molecular structure of LLDPE through reactive extrusion, such as disclosed in "Study of low concentrations of dicumyl peroxide on the molecular structure modification of LLDPE by reactive extrusion" (Valeria D. Ramos et al., Polymer Testing, Volume 23, Issue 8, December 2004, Pages 949-955).

Ionizing radiation (e.g., electron beams, gamma rays) can be used to modify polyolefin properties and lead to improved compatibilization. For example, depending upon dosage, electron beams can be used to add functionality to polyolefins by producing cross-links or by creating oxidized regions on the chains. During irradiation, free radicals can be produced by breakage of covalent bonds in the polymer, creating an oxidized polymer surface. Electron beam irradiation can create compatibility by creating strong intermolecular networks. In some aspects, free radical formation leads to PO cross-linking. Controlled electron beam modifications can also create a compatible interphase around the modified PO. For instance, electron beam irradiation can be used to generate (—OH) and (C═O) surface groups, transforming the once hydrophobic surface into a hydrophilic one.

Additives

The soft touch film compositions may optionally further include any suitable additive(s) as desired. Non-limiting examples of classes of additives contemplated in the film compositions disclosed herein include perfumes, dyes, pigments, nanoparticles, antistatic agents, fillers, and combinations thereof. The compositions disclosed herein can contain a single additive or a mixture of additives. For example, both a perfume and a colorant (e.g., pigment and/or dye) can be present in the composition. The additive(s), when present, is/are typically present in a weight percent of 0.05 wt % to 20 wt %, or 0.1 wt % to 10 wt %, based upon the total weight of the film composition.

As used herein the term "perfume" is used to indicate any odoriferous material that is subsequently released from the composition as disclosed herein. A wide variety of chemicals are known for perfume uses, including materials such as aldehydes, ketones, alcohols, and esters. More commonly, naturally occurring plant and animal oils and exudates including complex mixtures of various chemical components are known for use as perfumes. Perfumes can be included in the compositions in any suitable form, such as in the form of capsules or micro-capsules. For example, perfumes can be encapsulated by cyclodextrins in order to deliver longer-lasting scent.

The perfumes herein can be relatively simple in their compositions or can include highly sophisticated complex mixtures of natural and/or synthetic chemical components, all chosen to provide the desired scent. Typical perfumes can include, for example, woody/earthy bases containing exotic materials, such as sandalwood, civet and patchouli oil. The perfumes can be of a light floral fragrance (e.g. rose extract, violet extract, and lilac). The perfumes can also be formulated to provide desirable fruity scents, (e.g. lime, lemon, and orange). The perfumes delivered in the compositions and articles of the present invention can be selected for an aromatherapy effect, such as providing a relaxing or invigorating mood. As such, any suitable material that exudes a pleasant or otherwise desirable odor can be used as a perfume active in the compositions and articles of the present invention.

A pigment or dye can be inorganic, organic, or a combination thereof. Specific examples of pigments and dyes contemplated include pigment Yellow (C.I. 14), pigment Red (C.I. 48:3), pigment Blue (C.I. 15:4), pigment Black (C.I. 7), and combinations thereof. Specific contemplated dyes include water soluble ink colorants like direct dyes, acid dyes, base dyes, and various solvent soluble dyes. Examples include, but are not limited to, FD&C Blue 1 (C.I. 42090:2), D&C Red 6 (C.I. 15850), D&C Red 7 (C.I. 15850:1), D&C Red 9 (C.I. 15585:1), D&C Red 21 (C.I. 45380:2), D&C Red 22 (C.I. 45380:3), D&C Red 27 (C.I. 45410:1), D&C Red 28 (C.I. 45410:2), D&C Red 30 (C.I. 73360), D&C Red 33 (C.I. 17200), D&C Red 34 (C.I. 15880:1), and FD&C Yellow 5 (C.I. 19140:1), FD&C Yellow 6 (C.I. 15985:1), FD&C Yellow 10 (C.I. 47005:1), D&C Orange 5 (C.I. 45370:2), and combinations thereof.

Contemplated fillers include, but are not limited to, inorganic fillers such as, for example, the oxides of magnesium, aluminum, silicon, and titanium. These materials can be added as inexpensive fillers or processing aides. Other inorganic materials that can function as fillers include hydrous magnesium silicate, titanium dioxide, calcium carbonate, clay, chalk, boron nitride, limestone, diatomaceous earth, mica glass quartz, iron, and ceramics. Additionally, inorganic salts, including alkali metal salts, alkaline earth metal salts, phosphate salts, can be used. Additionally, alkyd resins can also be added to the composition. Alkyd resins can comprise a polyol, a polyacid or anhydride, and/or a fatty acid.

Other additives include personal care materials, such as moisturizers, skin conditioning additives (e.g. petrolatum, glycerol, wax), vitamins, cooling or warming sensates (e.g., menthol, cinnamon), or other benefit agents.

Additional contemplated additives include nucleating and clarifying agents for the thermoplastic polymer. Specific examples, suitable for polypropylene, for example, are benzoic acid and derivatives (e.g., sodium benzoate and lithium benzoate), as well as kaolin, talc and zinc glycerolate. Dibenzlidene sorbitol (DBS) is an example of a clarifying agent that can be used. Other nucleating agents that can be used are organocarboxylic acid salts, sodium phosphate and metal salts (e.g., aluminum dibenzoate). In one aspect, the nucleating or clarifying agents can be added in the range from 20 parts per million (20 ppm) to 20,000 ppm, or from 200 ppm to 2000 ppm, or from 1000 ppm to 1500 ppm. The addition of the nucleating agent can be used to improve the tensile and impact properties of the finished thermoplastic polymer composition.

Contemplated surfactants include anionic surfactants, amphoteric surfactants, or a combination of anionic and amphoteric surfactants, and combinations thereof, such as surfactants disclosed, for example, in U.S. Pat. Nos. 3,929,678 and 4,259,217, and in EP 414 549, WO93/08876, and WO93/08874.

Contemplated nanoparticles include metals, metal oxides, allotropes of carbon, clays, organically modified clays, sulfates, nitrides, hydroxides, oxy/hydroxides, particulate water-insoluble polymers, silicates, phosphates and carbonates. Examples include silicon dioxide, carbon black, graphite, grapheme, fullerenes, expanded graphite, carbon nanotubes, talc, calcium carbonate, betonite, montmorillonite, kaolin, zinc glycerolate, silica, aluminosilicates, boron nitride, aluminum nitride, barium sulfate, calcium sulfate, antimony oxide, feldspar, mica, nickel, copper, iron, cobalt, steel, gold, silver, platinum, aluminum, wollastonite, aluminum oxide, zirconium oxide, titanium dioxide, cerium oxide, zinc oxide, magnesium oxide, tin oxide, iron oxides ($Fe_2O_3$, $Fe_3O_4$) and mixtures thereof. Nanoparticles can increase strength, thermal stability, and/or abrasion resistance of the compositions disclosed herein, and can give the compositions electric properties.

Contemplated anti-static agents include fabric softeners that are known to provide antistatic benefits. These can include those fabric softeners having a fatty acyl group that has an iodine value of greater than 20, such as N,N-di (tallowoyl-oxy-ethyl)-N,N-dimethyl ammonium methylsulfate.

In particular aspects, the filler can comprise renewable fillers. These can include, but are not limited to, lipids (e.g., hydrogenated soybean oil, hydrogenated castor oil), cellulosics (e.g., cotton, wood, hemp, paperboard), lignin, bamboo, straw, grass, kenaf, cellulosic fiber, chitin, chitosan, flax, keratin, algae fillers, natural rubber, nanocrystalline starch, nanocrystalline cellulose, collagen, whey, gluten, and combinations thereof.

III. Multi-Layered Films

While its possible to provide adequate softness by incorporating renewable TPS into a monolayer film, there is still some reduction in the mechanical strength properties of these films, particularly in the CD direction. By incorporating the soft touch films described above in a multi-layer film, the overall mechanical properties may be improved, thereby providing a multi-layer film that incorporates a renewable material, has improved softness, may be produced using a blown process, and which has improved mechanical properties over a mono-layer film. Another advantage to multi-layer co extrusion is the ability to keep the TPS on the inside of a blown film bubble. Because TPS can be temperature sensitive and can give off volatiles that may contaminate the die surface and create smell in the production area, the ability to keep the TPS inside the bubble may prevent excessive die contamination and release of smelly volatile materials.

Each of the film layers may have a thickness greater than about 0.1 µm, 1 µm, 2 µm and/or less than about 25 µm, 10 µm, 8 µm or 6 µm. In some embodiments, the soft touch film skin (outer) layer may have a thickness about 0.5 µm in combination with 1 or 2 other film layers have a thickness from about 1 µm to about 2 µm. In some embodiments, the soft touch film layer is the thinnest layer in the multi-layer polymeric film, in order to minimize the amount of thermoplastic starch (to avoid thermal degradation of the starch during manufacture) while still incorporating enough thermoplastic starch to yield a satisfactory soft touch.

A wide variety of multi-layer films may be provided that incorporate one or more of the soft touch film compositions/layers described herein and one or more other polymeric film layers. A multi-layer film may comprise 2 or more layers. In some embodiments, the multi-layer polymeric film may comprise 2, 4, 6, 8, 10, 15, 20 or 30 or more layers inclusive of one or more soft touch film skin layers. In some embodiments, 2 or more soft touch film layers may be provided directly adjacent to or contiguous with each other in combination with one or more other film layers that are not soft touch film layers, wherein one of the soft touch film layers is provided as a skin layer and the other soft touch film layer is contiguous with both the soft touch film skin layer and a film layer that is not a soft touch film layer. For example, the following non-limiting arrangements may be provided: AAB, AB, ABA, ABC and ABCA, wherein the A layer is a soft touch film layer and the B and C layers are film layers other than a soft touch film layer, which may or may not include thermoplastic starch. In some embodiments the B and/or C film layers may comprise a polypropylene polymer or copolymer, a polyethylene polymer or copolymer, a blend of polypropylene polymers or copolymers, a blend of polyethylene polymers or copolymers and/or one or more other polymers. Some suitable types of polypropylene (PP) include, but are not limited to: homopolymer isotatic PP and copolymer propylene (coPP). Copolymer propylene (coPP) includes random and block polymers that include ethylene and other alpha-olefin comonomers to form copolymers such as propylene-ethylene block copolymers, propylene-ethylene random copolymers, heterophasic copolypropylene including impact copolypropylene (or "ICP"), as well as any blend thereof. Some suitable types of polyethylenes (PE) include, but are not limited to: linear low density polyethylene (LLDPE), low density polyethylene (LDPE), medium density polyethylene (MDPE), ethylene vinyl acetate, and ethylene copolymers such as random or multiblock ethylene alpha-olefin. Some examples of a suitable commercial resins are DOWLEX® 2045 and DOWLEX® 2027, available from the Dow Chemical Company of Midland, Mich., U.S.A, Exxon Mobil 129.24 LDPE, and Lyondell Basell Impact Copolymer Polypropylene PROFAX® 7624. In some embodiments, the B film layer and/or the C film layer may comprise a blend of LLDPE and LDPE. In other embodiments, the B film layer and/or the C film layer may comprise a polypropylene polymer and LLDPE polymer blend.

In some embodiments, other layers of the multilayer film may be formed from a non-woven, paper, cloth, etc., or a film composition that is substantially or completely free of TPS. In some embodiments, the soft touch film is in the form of an extrusion coating, which coats a substrate, such as paper or a non-woven substrate. In other embodiments, the soft touch film can advantageously be used as a skin layer that is contiguous with at least one or more other layers.

In one example, the soft touch film can be used as an external or outer skin layer in an ABC coextrusion wherein the outer, soft layer A is placed adjacent to the ultimate user side of the film and a non-TPS containing inner layer C is disposed adjacent to the product side of the film. In some embodiments, it may be advantageous for successive layers, from the outer layer to the inner most layer, to incorporate decreasing concentrations of TPS. For example, an ABC coextruded multilayer film may be provided, wherein layer A comprises TPS having a concentration greater than 10 wt %, or greater than 15 wt %, or greater than 20 wt %, or greater than 25 wt %; layer B comprises TPS having a lower concentration than layer A, and layer C is substantially or completely free of TPS. Further, due to melt processing issues with TPS in general (die lip contamination, offgassing of volatiles, smells, etc.), the restriction of the TPS to a single skin layer such as inside the bubble of a blow film, reduces many of these processing related problems. In another example, the soft touch film is used as external or outer skin layer in an ABA coextrusion wherein the soft layer A is placed in both skin layers of the 3-layer film. Layer B is substantially free or completely free of TPS.

Some examples of other layers that may be disposed contiguous with a soft touch film layer are described, for example, in U.S. patent application Ser. No. 14/051,891, "Multi-Layer Polymeric Films," filed Oct. 11, 2013 (P&G Case 13051) and patent application Ser. No. 14/051,915, "Multi-Layer Polymeric Films Containing Energy Dissipating Layers," filed Oct. 11, 2013 (P&G Case 13052), both of which are herein incorporated by reference. One or more of the skin layers described in these patent applications can be substituted with a soft touch film described herein. This will create a multilayered film comprising: (1) a core as described in either of the aforementioned applications, and (2) one or more soft skin layers described herein.

The soft touch film layer(s) may comprise from about 5% to about 90% by weight of the multilayer polymeric film. In other embodiments, the soft touch film layer may comprise from about 10% to about 45% by weight of the multilayer polymeric film, particularly where there is only one soft touch film layer in the multilayer polymeric film. In still other embodiments, the soft touch film layer may comprise from about 5% to about 35% by volume of the multilayer polymeric film. In still yet other embodiments, the multilayer film is an ABA configuration comprising 5 vol %/90 vol %/5 vol % of the film layers, respectively, of the multilayer film, or an AB configuration comprising 10 vol %/90 vol % of the film layers, respectively, by weight of the multilayer film, or an ABC configuration comprising 10 vol %/30 vol %/60 vol % of the film layers, respectively, of the multilayer film.

IV. Methods of Making and Articles of Manufacture

The soft touch film layers described herein may be formed using conventional procedures for producing films on conventional coextruded film-making equipment. In general, polymers can be melt processed into films using either cast or blown film extrusion methods both of which are described in Plastics Extrusion Technology-2nd Ed., by Allan A. Griff (Van Nostrand Reinhold-1976). In addition, the single and multi-layer films of the present invention can be extrusion coated onto another substrate and/or extrusion laminated to two additional substrates. The single and multilayer films of the present invention can be post processed into highly oriented films using various orientation processes such as machine direction orientation, tentering, solid state formation, and ring-rolling as examples.

Non-embossed cast film is extruded through a flat die. Generally, the flat molten web is cooled on a large moving polished metal roll (chill roll) with an air knife used to impinge the melt onto the roll. It quickly cools, and peels off the first roll, passes over one or more auxiliary rolls, then through a set of rubber-coated pull or "haul-off" rolls, and finally to a winder. In cast embossed film, the polished metal roll is replaced with a matte finish roll and a rubber backing roll is used to impinge the melt onto the microtextured matte roll. The molten film contacts the matte roll and is imparted with the microtexture present on the matte roll. The resulting film has a microtextured produced by the process and is generally not specific to the film formulation used. The film of the present invention can be used to produce a soft microtextured film either by the non-embossed process or the embossed process, which is highly advantageous.

In blown film extrusion, the melted film composition is extruded upward, downward, or sideways through a thin annular die opening. This process is also referred to as tubular film extrusion. Air is introduced through the center of the die to inflate the tube and cause it to expand. A moving bubble is thus formed which is held at constant size by simultaneous control of internal air pressure, extrusion rate, and haul-off speed. The tube of film is cooled by air blown through one or more chill rings surrounding the tube. The tube is next collapsed by drawing it into a flattened frame through a pair of pull rolls and into a winder. Other blown film type processes included double bubble and triple bubble processes where additional orientation and/or annealing is achieved. This invention is applicable to all blown film processes.

A coextrusion process requires more than one extruder and either a coextrusion feedblock or a multi-manifold die system or combination of the two to achieve a multilayer film structure. U.S. Pat. Nos. 4,152,387 and 4,197,069, incorporated herein by reference, disclose the feedblock and multi-manifold die principle of coextrusion. Multiple extruders are connected to the feedblock which can employ moveable flow dividers to proportionally change the geometry of each individual flow channel in direct relation to the volume of polymer passing through the flow channels. The flow channels are designed such that, at their point of confluence, the materials flow together at the same velocities and pressure, minimizing interfacial stress and flow instabilities. Once the materials are joined in the feedblock, they flow into a single manifold die as a composite structure. Other examples of feedblock and die systems are disclosed in Extrusion Dies for Plastics and Rubber, W. Michaeli, Hanser, New York, 2nd Ed., 1992, hereby incorporated herein by reference. It may be important in such processes that the melt viscosities, normal stress differences, and melt temperatures of the material do not differ too greatly. Otherwise, layer encapsulation or flow instabilities may result in the die leading to poor control of layer thickness distribution and defects from non-planar interfaces (e.g. fish eye) in the multilayer film.

An alternative to feedblock coextrusion is a multi-manifold or vane die as disclosed in U.S. Pat. Nos. 4,152,387, 4,197,069, and 4,533,308, incorporated herein by reference. Whereas in the feedblock system melt streams are brought together outside and prior to entering the die body, in a multi-manifold or vane die each melt stream has its own manifold in the die where the polymers spread independently in their respective manifolds. The melt streams are married near the die exit with each melt stream at full die width. Moveable vanes provide adjustability of the exit of each flow channel in direct proportion to the volume of material flowing through it, allowing the melts to flow together at the same velocity, pressure, and desired width.

Since the melt flow properties and melt temperatures of polymers vary widely, use of a vane die has several advantages. The die lends itself toward thermal isolation characteristics wherein polymers of greatly differing melt temperatures, for example up to 175° F. (80° C.), can be processed together.

Each manifold in a vane die can be designed and tailored to a specific polymer. Thus the flow of each polymer is influenced only by the design of its manifold, and not forces imposed by other polymers. This allows materials with greatly differing melt viscosities to be coextruded into multilayer films. In addition, the vane die also provides the ability to tailor the width of individual manifolds, such that an internal layer can be completely surrounded by the outer layer leaving no exposed edges. The feedblock systems and vane dies can be used to achieve more complex multilayer structures. In addition, the films of the present invention can be produced in a nanolayering context where layer multipliers divide and stack multiple layers to produce a factor increase in the number of internal layers and corresponding decrease in the internal layer thicknesses. Using such a process, the film may contain several thousand layers of nanometer type dimensions internally. The soft film of the present invention can be used as a skin over these internal multi-layers.

If desired, the soft touch films as disclosed herein can be in the form of water impervious, microporous breathable films containing a multitude of micropores. The pore sizes are smaller than a drop of water, so water droplets cannot penetrate unless extraordinary pressure is applied. However, the pores are much larger than water vapor molecules, so steam and perspiration can readily penetrate the film and pass from one side of the film to the other. Such films are especially suitable for use as a topsheet in an absorbent article.

Any suitable method can be used to make such microporous films. One such method comprises adding a rigid inorganic filler, such as calcium carbonate, clay, barium sulfate, titanium dioxide, or other finely powdered inorganic materials to the film formulation. It is believed that the adhesion between the continuous phase polymer and the dispersed phase (i.e., filler) is poor, and microvoids will form around the dispersed phase inclusions when the composite film is stretched. The continuous phase polymer/filler blend is extruded as a "precursor" non-porous film, and then the precursor film is stretched mechanically to form a microporous film that provides air and moisture vapor breathability. Filled polymer films may be easily stretched at room temperature or at elevated temperatures to form microporous materials.

Typically, a microporous film composition contains about 50±10% by weight of inorganic filler, with the balance being one or more polyolefin polymers such as polyethylene and/or polypropylene. To ensure the pores connect together through the film thickness, there must be enough inorganic filler present, and the film must be stretched enough to form micropores that can interconnect to form pathways through the film. The size of the micropores, and hence the moisture vapor transmission rate (MVTR) and breathability of such microporous film or composite, is affected by the particle size and particle size distribution of the filler. By adjusting the polymer matrix and the layer arrangement of multilayer films, microporous films with controlled properties (e.g., pore size, pore size distribution, air and moisture permeation rate, leakage barrier) can be obtained. MVTR can be measured using the method set forth in U.S. Patent Pub. No. US 2007/01 67929 A1 (Published Jul. 19, 2007, by Fossum).

Any suitable stretching method can be used for making the microporous film precursor to render the film microporous. For example, machine direction orientation (MDO) involves passing the film between at least two pairs of rollers. The second pair of rollers (T2) is running faster (V2) than the first pair of rollers (T1 and V1). The ratio of V2/V1 determines the degree of stretching. Another method is cross machine direction tentering, which entails grabbing the side edges of the film and stretching the film sideways. Another film stretching technique is incremental stretching, also called intermeshing or interdigitating stretching. This method is described in U.S. Pat. No. 4,152,751 (to Schwarz); U.S. Pat. No. 4,153,665 (to Sabee); U.S. Pat. No. 5,202,173 (to Wu); and U.S. Pat. No. 5,865,926 (to Wu). In this method, the film passes between two grooved or toothed rollers. The grooves or teeth intermesh without touching each other when the rollers are brought together. As the film passes between the two rollers, it is stretched as it zigzags between these intermeshing teeth. Stretching by intermeshing has the advantage of causing the film to stretch in many small increments that are evenly spaced over the entire film in the machine direction (MD), the cross direction (CD), at oblique angles to the MD, or in any combination thereof. The depth to which the intermeshing teeth engage controls the degree of stretching.

Another means for creating micropores is a process commonly referred to as a "SELF" or "SELF'ing" process, in which SELF stands for Structural Elastic Like Film. SELFing involves passing the film through a configuration of opposing toothed forming rolls in order to expand portions of the film in the thickness dimension, by expanding portions of the film out of the X-Y plane in the Z-direction. One example of the SELF process is describe in U.S. Pat. No. 7,303,861. Another means for creating micropores is "rotary knife aperturing" (RKA). In RKA, a process and apparatus using counter-rotating meshing nip rolls similar to those described above with respect to SELF is utilized. RKA differs from SELF in that the relatively flat, elongated teeth of a SELF have been modified to be generally pointed at the distal end. Teeth can be sharpened to cut through as well as deform the film to produce a three-dimensionally apertured film.

Yet another method for forming macro and microapertures involves applying a high pressure fluid jet comprised of water or the like against one surface of the film, desirably while applying a vacuum adjacent the opposite surface of the film. In general, the film is supported on one surface of a forming structure having opposed surfaces. The forming structure is provided with a multiplicity of apertures there through which place the opposed surfaces in fluid communication with one another. While the forming structure may be stationary or moving, an exemplary execution uses the forming structure as part of a continuous process where the film has a direction of travel and the forming structure carries the film in the direction of travel while supporting the film. The fluid jet and, desirably, the vacuum cooperate to provide a fluid pressure differential across the thickness of the film causing the film to be urged into conformity with the forming structure and to rupture in areas that coincide with the apertures in the forming structure.

The film passes over two forming structures in sequence. The first forming structure being provided with a multiplicity of fine scale apertures which, on exposure to the aforementioned fluid pressure differential, cause formation of microapertures in the web of film. The second forming structure exhibits a macroscopic, three-dimensional cross section defined by a multiplicity of macroscopic cross section apertures. On exposure to a second fluid pressure differential the film substantially conforms to the second forming structure while substantially maintaining the integrity of the fine scale apertures.

Such methods of aperturing are known as "hydroformation" and are described in greater detail in U.S. Pat. Nos. 4,609,518; 4,629,643; 4,637,819; 4,681,793; 4,695,422; 4,778,644; 4,839,216; and 4,846,821. The apertured web can also be formed by methods such as vacuum formation and using mechanical methods such as punching. Vacuum formation is disclosed in U.S. Pat. No. 4,463,045. Examples of mechanical methods are disclosed in U.S. Pat. Nos. 4,798,604; 4,780,352; and 3,566,726.

The soft film layer can be used as a component of a consumer product, such as those selected from the group consisting of a packaging material, a packaging assembly used to wrap consumer products, and absorbent articles. Where the consumer product is an absorbent article, the article can be selected from the group consisting of diapers, training pants, adult incontinence products, pantiliners, tampons, feminine hygiene pads, tissues, and wipes.

In some embodiments, the soft touch film described herein may be incorporated in an absorbent article comprising a topsheet, a backsheet, and an absorbent core positioned at least partially intermediate the topsheet and the backsheet. The soft touch films described herein may be used to form at least a portion of the topsheet and/or the backsheet. At least a portion of the topsheet may be liquid permeable while the backsheet is liquid impermeable, or at least substantially liquid impermeable. The topsheet is the part of the absorbent article that is directly in contact with the wear's skin. The topsheet may be joined to the backsheet, the core and/or any other layers as is known in the art. Usually, the topsheet and the backsheet are joined directly to each other in some locations (e.g., on or close to the periphery of the article) and are indirectly joined together in other locations by directly joining them to one or more other elements of the absorbent article. The backsheet is generally that portion of the absorbent article positioned adjacent the garment-facing surface of the absorbent core and which prevents, or at least inhibits, the exudates absorbed and contained therein from soiling articles such as bedsheets and undergarments.

Some examples of absorbent articles are described in USPNs 2015/0065981; U.S. Pat. Nos. 3,860,003; 5,221,274; 5,554,145; 5,569,234; 5,580,411 and 6,004,306.

V. Methods

Descriptive Analysis Panel

The tactile results set forth in the Examples are provided by a Descriptive Analysis Panel comprising 17 trained and qualified sensory judges who are not employees of the assignee. Reference products with a known score are used as part of their training to demonstrate the full range of intensities on the 100 point scale for each of the sensory attributes measured. The expert panel is trained and qualified according to ASTM standards, Sensory Testing Methods for Descriptive Testing (Manual 26: MNL 26 $2^{nd}$ edition) which provides Guidelines for the Selection and Training of Sensory Panel Members. During a test, the test products (films in this case) are presented with 3-digit codes in a random order, using a sequential monadic test design. The tested characteristics are measured under standardized environmental conditions (controlled temperature and humidity). The films are evaluated on a 0-100 point scale, anchored as 0=none, 50=moderate and 100=extreme amount. The data is reported as means for the entire group, and the data is analyzed using 2-way ANOVA with LSD post-hoc comparisons at 95% confidence.

SEM for Discrete Phase Confirmation

Discrete phase materials are best determined by visual inspection under scanning electron microscopy. Films are cross-sectioned along the CD direction using a microtome blade and liquid nitrogen to assist in the cut quality. The film sample is first dipped in liquid $N_2$ and removed. While still extremely cold, the microtome blade is used to quickly cut along the CD thus exposing a cross section of the film. The cross section is then mounted into a split mount SEM mount and sputter coated with a thin layer of gold (<1 nm). The cross section is then examined under 500× magnification to look for the presence of discrete domains.

Surface Texture Analysis Using ISO 25178 and 3-D Laser Microscopy

The method used to characterize surface texture is 3-D Laser Scanning Microscopy ("3 DLSM"). 3DLSM can be used to collect topographic data over a given area on a sample surface. This 3-D data can be analyzed following ISO standards to quantitatively characterize the microtextural features of that surface; ISO 25178 provides a framework for this characterization. Film samples for analysis are prepared by cutting a representative piece of the film approximately 2.5 centimeters by 3.75 centimeters and taping it to a standard glass microscope slide. Sample is taped so as to eliminate or reduce wrinkling without stretching the film. The sample is mounted onto the stage of a Keyence VK-X200 series 3D Laser Scanning Microscope (consisting of a VK-X200K controller and a VK-X210 Measuring Unit). The instrument manufacturer's software is used for data collection ("VK Viewer") and data analysis ("VK Analyzer"); the manufacturer provides an ISO 25178 analysis module that is used to extract parameters in compliance with ISO 25178. Images are collected using 50× and 150× objective lenses provided with the instrument. Data is acquired using the acquisition software's "Expert Mode"

wherein the following parameters are set: height scan range is set to encompass the height range of the sample (this can vary from sample to sample depending on the surface topography of each); step size is set to 0.10 micrometers for the 50× objective and 0.05 micrometers for the 150× objective; laser intensity and detector gain are optimized for each sample using the autogain feature of the instrument control software (maximizes reflected laser signal without causing detector saturation). Prior to analysis, data is subjected to noise removal (following built in algorithm in the analysis software) and tilt is removed as necessary. The entire area of a data set (image) is analyzed using the ISO 25178 module to yield a host of parameters.

The parameters most pertinent to softness were determined to be Sa (average surface roughness), mr50 (Areal material ratio at a height of 0.1 micron), and Sdq (Root mean square gradient).

Film Layer Thickness

Film layer thickness can be measured using the methodology set forth in ISO 4593:1993, Plastics—Film and sheeting—Determination of thickness by mechanical scanning.

Mechanical Properties

2% secant modulus and ultimate strength are measured according to ASTM method D882, Standard Test Method for Tensile Properties of Thin Plastic Sheeting. Tensile testing may be done using an MTS Systems Corporation Synergie 400 instrument with a 100N load cell or an equivalent tensile testing machine. For the Examples, test samples were pulled according to ASTM D882 with a crosshead speed of 25.4 cm/min and a gage length of 5 cm. Tensile at break and 2% secant modulus were recorded and reported in SI units.

EXAMPLES

The following examples further describe and demonstrate particular executions of the soft touch films described herein together with several comparative examples. All of these examples are given solely for the purpose of illustration and are not to be construed as limitations of the present invention since many variations thereof are possible without departing from the spirit and scope of the invention. Ingredients are identified by chemical name, or otherwise defined below. Comparative Example 1 is the commercially available consumer tissue package from Nepia. Comparative Examples #2 to #5 illustrate various mono-layer films comprising combinations of higher modulus polymers and one of TPS or a lower modulus polymer. Examples #1 to #8 illustrate various mono-layer films comprising combinations of higher modulus polymers, TPS and one or more of a low modulus polymer and/or a SMA. Examples #9 to #13 illustrate various multi-layer films, wherein one of the film layers comprises combinations of higher modulus polymers, TPS and one or more of a low modulus polymer and a SMA.

In all the examples (except Comparative Example 1), the thermoplastic starch was added as a masterbatch composition available as either BLF-02 or BLF-04 from Cardia, Inc. The approximate formulas for the TPS masterbatches of are set forth in Tables 1 and 2. Table 3 summarizes the expert panel and mechanical test results for the mono-layer films together with the wt % for the TPS, low modulus thermoplastic polymer, SMA and higher modulus thermoplastic polymers. Table 4 summarizes the 3D laser microscope and profilometry results for Comparative Examples #1 to #4 and Examples #1 to #8.

TABLE 1

| Material | Approximate Weight % |
|---|---|
| Acetylated Cornstarch DS > 0.1 | 50 |
| Glycerol | 10 |
| Sorbitol | 5 |
| Ethylene acrylic acid copolymer | 10 |
| Low modulus polymer | 10 |
| LDPE | 14 |
| Other (Process aids) | 1 |
| Total | 100 |

TABLE 2

| Material | Weight % |
|---|---|
| Acetylated Cornstarch DS > 0.1 | 60 |
| Glycerol | 11 |
| Sorbitol | 6 |
| Ethylene acrylic acid | 11 |
| Low modulus polymer | 11 |
| Other (Process aids) | 1 |
| Total | 100 |

Comparative Example #1

From thermal analysis (DSC), the "Nepia" film appears to comprise LLDPE or a majority blend of LLDPE and minority of LDPE with overall density around 0.915 to 0.918 g/cc, which is within the standard range for traditional LLDPE and LDPE blends. However, this film has mechanical strength properties (see, Table 3) below which might be expected from traditional LLDPE. The 2% secant modulus in the MD direction limits its use in high speed web handling and conversion for diapers, feminine hygiene products, etc. This film appears to be cast and deeply embossed, resulting in a heavily microtextured surface. Without intending to be bound by any theory, it is believed that the reduced mechanical properties may be due to the extensive micro-texturing. The large "crater-like" impressions through the Nepia film may create "weak points" and "defects" within the film that compromise mechanical strength. However, the tactile properties of the Comparative Example #1 are exceptional with an overall softness rating of 9.7, the noise and non-tacky perception are also exceptional at 5.6 (=low noise) and 8.8 (=non-tacky) out of 10.

Mono-layer Comparative Examples #2 to #5 and Mono-layer Examples #1 through #9

Comparative Examples #2 to #5 and Examples #1 to #8 are prepared on a pilot scale monolayer cast film line without embossing. The pilot cast process is fed by a single 25 mm Merritt Davis extruder with a 24 L:D and three temperature control zones. A heated transfer pipe transports the polymer melt from the extruder to the die entrance. The raw materials (typically in pellet form) are introduced into the hopper as a physically mixed blend. The materials are melt mixed and pumped by the extruder to the downstream film die. The extruder is attached to a 254 mm EDI single manifold coat hanger die with a no pressure lip setting of 750 microns. The resulting extrudate is cast onto a casting cart made by Killion Inc. The extrudate is first contacted by a chrome finish chill roll operating at 30° C. over a 100 mm melt curtain. This roll is smooth and does not impart any form of embossing onto the film. The film is nipped using a standard rubber pressure roll. The extrudate is cooled to produce the final film form that was wrapped continuously onto a 75 mm core. The three extruder zones are maintained at 170° C., 175° C., and 175° C. The adapter plate, transfer pipe, and clamp are also maintained at 175° C. The extruder operates at 30 RPM. The chill roll speed is maintained constant at approximately 2.4 mpm.

Comparative Example #2 represents a polymer blend that might be used in high speed converting operations having good mechanical strength (e.g., MD/CD 2% secant modules >200 MPa and MD/CD ultimate strength >30 MPa). Comparative Example #3 illustrates the effect of adding a low modulus thermoplastic polymer to the blend of Comparative Example #3, resulting in a decrease of the 2% secant modulus.

Comparative Example #4 illustrates the effect of adding a thermoplastic starch to the composition of Comparative Example #2. The addition of a moderate amount of TPS in Comparative Example #4 reduced all the mechanical properties but not to a point that this composition would be unacceptable for high speed converting operations. Comparative Example #5, however, which incorporated a significant amount of TPS to the composition of Comparative Example #5 resulted in significant reductions in MD and CD ultimate strength and 2% secant modulus to a point that this composition would be unacceptable for high speed converting operations. In addition, the expert panel rated Comparative Example #5 lower in softness compared to Comparative Example #4. It is believed that an excessive number of bumps in the composition of Comparative Example #5 likely over-stimulated the MCs thus resulting in a less favorable tactile impression. The overall softness score of 4.9 for Comparative Example #4 is still well below Comparative Example #1.

An expert panel rated Example #4 at a softness rating of 7.0 and Example #6 at 6.7, which illustrates that a sufficient level of low modulus thermoplastic polymer in combination with a SMA can maintain or improve softness over a much wider range of TPS level. In fact, the inclusion of a low modulus thermoplastic polymer and SMA in Examples #4 and #6 provided a significantly softer film compared Comparative Examples #4 and #5. Still further, Examples #4 and #6 were rated as more quiet compared to Comparative Examples #4 and #5.

Turning to Table 4 (profile data), several observations are noteworthy. First, Example #8 (which contained 40 wt % SMA) showed an anomaly in microtextural height. The height was measured to be significantly less than all other examples. It's believed that this result may be due to the excessive deposition of the SMA onto the microtextured surface. In essence, the SMA "flooded" and covered the microtexture making it less predominate. Second, Comparative Example #5 had an extremely large roughness value (Ra=3.5 micron) indicative of the excessive TPS present in the sample, which may have influenced the low softness rating (3.5). Example #4, which had a similar amount of TPS but also included a low modulus thermoplastic polymer and SMA had a much lower roughness value (Ra=1.26 um) which was presumably reflected in the softness rating (7.0). Without intending to be hound by any theory, it is believed that a microtexture Ra<3.5 um and >0.1 um may be desirable for softness.

TABLE 3

| Examples | Higher Modulus Polymer Blend[1] (wt %) | TPS MB[2] (wt % total) (wt % TPS/ LMP[3]/ LDPE) | Low Modulus Polymer[4] (wt %) | SMA MB[5] (wt %) | Expert Panel Results | | | 2% Secant Modulus (MPa) | | Ultimate Strength (MPa) | |
|---|---|---|---|---|---|---|---|---|---|---|---|
| | | | | | Softness | Noise from Crinkle | Not Tacky | MD | CD | MD | CD |
| Comparative Ex. #1 | — | — | — | — | 9.7 | 5.6 | 8.8 | 89 | 92 | 17.8 | 27.5 |
| Comparative Ex #2 | 100 | 0 0/0/0 | 0 | 0 | 6.4 | 7.6 | 6.0 | 234 | 249 | 50.8 | 32.9 |
| Comparative Ex #3 | 70 | 0 0/0/0 | 30 | 0 | 6.2 | 6.7 | 2.7 | 142 | 169 | 42.5 | 31.0 |
| Comparative Ex #4 | 75 | 25 17/2.5/3 | 0 | 0 | 4.9 | 7.0 | 6.4 | 211 | 210 | 31.2 | 12.7 |
| Comparative Ex #5 | 30 | 70 47/7/8 | 0 | 0 | 3.5 | 6.5 | 6.0 | 137 | 61 | 12.5 | 2.8 |
| Ex #1 | 55 | 25 17/2.5/3 | 20 | 0 | 6.0 | 5.7 | 7.2 | 156 | 167 | 35.4 | 16.1 |
| Ex #2 | 45 | 25 17/2.5/3 | 30 | 0 | 6.0 | 6.1 | 6.5 | 139 | 144 | 32.8 | 15.7 |
| Ex #3 | 5 | 25 17/2.5/3 | 70 | 0 | 7.9 | 4.8 | 6.3 | 41 | 89 | 30.3 | 19.1 |
| Ex #4 | 5 | 60 39/6/7 | 30 | 5 | 7.0 | 5.8 | 7.9 | 105 | 77 | 20.0 | 9.7 |
| Ex #5 | 44 | 25 17/2.5/3 | 30 | 1 | 6.3 | 5.6 | 7.1 | 150 | 163 | 35.4 | 15.2 |
| Ex #6 | 40 | 25 17/2.5/3 | 30 | 5 | 6.7 | 6.0 | 7.8 | 183 | 191 | 39.3 | 16.1 |
| Ex #7 | 35 | 25 17/2.5/3 | 30 | 10 | 6.8 | 6.1 | 8.0 | 171 | 161 | 29.1 | 10.3 |

TABLE 3-continued

| Examples | Higher Modulus Polymer Blend[1] (wt %) | TPS MB[2] (wt % total) (wt % TPS/ LMP[3]/ LDPE) | Low Modulus Polymer[4] (wt %) | SMA MB[5] (wt %) | Expert Panel Results | | | 2% Secant Modulus (MPa) | | Ultimate Strength (MPa) | |
|---|---|---|---|---|---|---|---|---|---|---|---|
| | | | | | Softness | Noise from Crinkle | Not Tacky | MD | CD | MD | CD |
| Ex #8 | 5 | 25 17/2.5/3 | 30 | 40 | 7.6 | 6.0 | 8.3 | 41 | 89 | 30.3 | 19.1 |
| Ex #9 | | | | | | | | | | | |

[1]For Comparitve Examples #2 to #4 and Examples #1 to #8, 65 wt % Dowlex 2045G, 25 wt % Dowlex 2027, and 10 wt % ExxonMobil LD 129.24.
[2]Cardia BLF-02
[3]LMP = Low modulus polymer, which was Dow Attane 4404G.
[4]Dow Attane 4404G
[5]Ampacet 10090, 5 to 5.5 wt % erucamide in LDPE

TABLE 4

| Example | TPS (wt %) | 3D Microscopy Results | | Profilometery | |
|---|---|---|---|---|---|
| | | Sa (um) | Sdq | mr50 (%) | Ra (um) |
| Comparative Ex. #1 | 0 | 2.24 | 0.98 | 49.73 | 1.90 |
| Comparative Ex. #2 | 0 | 0.10 | 0.63 | 21.83 | 0.21 |
| Comparative Ex. #3 | 0 | 0.12 | 0.71 | 23.97 | 0.20 |
| Comparative Ex. #4 | 17 | 1.37 | 0.65 | 42.00 | 1.54 |
| Comparative Ex. #5 | 47 | 3.59 | 2.47 | 46.17 | 3.81 |
| Example #1 | 17 | 1.28 | 0.80 | 43.50 | 1.56 |
| Example #2 | 17 | 1.21 | 0.67 | 44.93 | 1.59 |
| Example #3 | 17 | 0.88 | 0.82 | 41.00 | 0.82 |
| Example #4 | 40 | 1.26 | 2.49 | 38.47 | 1.47 |
| Example #5 | 17 | 1.08 | 0.80 | 43.40 | 1.32 |
| Example #6 | 17 | 1.20 | 0.77 | 43.13 | 1.29 |
| Example #7 | 17 | 1.14 | 0.65 | 42.63 | 1.32 |
| Example #8 | 17 | 0.36 | 0.84 | 36.97 | 0.33 |

Multilayer Examples

Examples 9 to 13 are blown, multi-layer films comprising one or more soft touch film layers. Table 5 sets forth the composition of the layers of the multi-layer films while Table 6 summarizes the mechanical properties and expert panel ratings for softness, noise and tackiness.

Examples 9 through 13 below are prepared on a Dr. Collin GmbH blown film system in various extruder and die configurations to produce mono-layer, bi-layer, tri-layer, and 5-layer films. The blown film system is setup with 5 extruders feeding a 5-layer pancake blown die. 4 of the 5 extruders are identical with 25 mm diameter and 30:1 L/D; each containing general purpose screws. In this configuration, 1-25 mm extruder supplies material to the internal skin layer. A second 25 mm extruder supplies material to the tie layer adjacent to the internal skin layer. A third 25 mm extruder supplies material to the external skin layer. A 4$^{th}$ 25 mm extruder supplies material to the tie layer adjacent to the external skin layer. The 5$^{th}$ extruder is a 30 mm diameter, 30:1 L/D machine with a general purpose screw. This extruder supplies the core material for the current 5-layer configuration. Each extruder has 6 heating zones. Temperature profiles are 25° C. at the feed zone (1), 170° C. at Zone 1 (Cylinder 1), then 175° C. in all succeeding zones (Cylinders 2-5). The extruders are attached to the die with a 2 zone pipe of 25 mm diameter and a length of ~1 m. The pipes are heated to 175° C. The multi-layer film is developed in the pancake die. The die has a 100 mm diameter output with a 1.6 mm gap capable of producing blow up ratios from 1 to 3, with a ratio of 2 being used for these films. 8 heating zones heat the die. All heating zones (Die 1-8) are set at 175° C. The equipment is setup for a 5-layer/5-material coextrusion. However, any combination can be created by varying the material in each extruder. For example, a single layer film can be created by placing material A in all 5 extruders. The resulting film will strictly be an AAAAA five-layer film but functionally speaking, it is a mono-layer film of composition A. Another example involves the production of an AB coextrusion. If material A is placed in extruders providing the external skin, external tie layer, and core while material B is placed in the remaining 2 extruders, then an AAABB 5-layer coextrusion is produced. However, the AAABB is functionally speaking an AB bi-layer coextrusion.

Example 9 (multi-layer film AAAAA=A), produced on the 5-layer blown film line)(3BL3-2): 28 wt % Dowlex 2045G, 11 wt % Dowlex 2027, 4 wt % ExxonMobil 129.24, 22 wt % Cardia BLF-04, 30 wt % Attane 4404G, and 5 wt % Ampacet 10090 is loaded into 4-25 mm extruders and 1-30 mm extruder. The extruder outputs are adjusted to achieve a layer ratio of 15/5/60/5/15 or essentially a 100% monolayer since all the extruders supply the same material. The temperature profile is 175° C. The film is collected at a line speed sufficient to produce films of 12, 25, and 50 microns in thickness.

Example 10 (5-layer blown film AABAA=ABA), produced on the 5-layer blown film line, Test Condition 3BL3-4, 15/5/60/5/15=20/60/20): 28 wt % Dowlex 2045G, 11wt % Dowlex 2027, 4 wt % ExxonMobil LD129.24, 22 wt % Cardia BLF-02, 30 wt % Attane 4404G, and 5 wt % Ampacet 10090 is loaded into 4-25 mm extruders supplying the skins and tie layers. 65 wt % Dowlex 2045G, 25 wt Dowlex 2027, and 10 wt % ExxonMobil 129.24 is loaded into the 30 mm core extruder. The extruder outputs were adjusted to achieve a layer ratio of 15/5/60/5/15=20/60/20. The temperature profile is 175° C. The film is collected at a line speed sufficient to produce films of 12, 25, and 50 microns in thickness.

Example 11 (Multi-layer film AAABB=AB), produced on the 5-layer blown film line, Test Condition 3BL3-3, 20/5/35/10/30=60/40): 28 wt % Dowlex 2045G, 11wt % Dowlex 2027, 4 wt % ExxonMobil LD129.24, 22 wt % Cardia BLF-02, 30 wt % Attane 4404G, and 5 wt % Ampacet 10090 is loaded into 2-25 mm extruders supplying the external skin and adjacent tie layer and also in the 30 mm core extruder. 65 wt % Dowlex 2045G, 25 wt Dowlex 2027, and 10 wt % ExxonMobil 129.24 are loaded into 2-25 mm extruders supplying the internal skin and adjacent tie layer. The extruder outputs were adjusted to achieve a layer ratio of 20/5/35/10/30=60/40. The temperature profile is 175° C.

The film is collected at a line speed sufficient to produce films of 12, 25, and 50 microns in thickness.

Example 12 (multi-layer film AABBB=AB), produced on the 5-layer blown film line, Test Condition 3BL3-14, 45/5/40/5/5 or 50/50): 16 wt % Dowlex 2045G, 6 wt % Dowlex 2027, 3 wt % ExxonMobil 129.24, 40 wt % BLF-04, 30 wt % Attane, and 5% Ampacet 10090 is loaded into 2-25 mm extruders supplying material to the outside skin and the adjacent tie layer. 20 wt % Profax 7624, 80 wt % Dowlex 2045G is loaded into 2-25 mm extruders supplying material to the internal skin and adjacent tie layer and the 30 mm extruder supplying material to the core. The extruder outputs were adjusted to achieve a layer ratio of 45/5/40/5/5 or essentially 50/50 due to duplication of materials in various streams. The temperature profile is 175° C. The film is collected at a line speed sufficient to produce films of 12, 25, and 50 microns in thickness.

Example 13 (Multi-layer film ABC), produced on the 5-layer blown film line, Test Condition 3BL3-11, 35/5/25/5/30=40/25/35): 28 wt % Dowlex 2045G, 11wt % Dowlex 2027, 4 wt % ExxonMobil LD129.24, 22 wt % Cardia BLF-02, 30 wt % Attane 4404G, and 5 wt % Ampacet 10090 is loaded into 2-25 mm extruders supplying the external skin and adjacent tie layer. 16 wt % Dowlex 2045G, 6 wt % Dowlex 2027, 3 wt % ExxonMobil 128.24, 40 wt % BLF-04, 30 wt % Attane 4404G, and 5 wt % Ampacet 10090 is loaded into the 30 mm extruder supplying core. 65 wt % Dowlex 2045G, 25 wt Dowlex 2027, and 10 wt % ExxonMobil 129.24 is added to the other two 25 mm extruders supplying the internal skin and tie layer. The extruder outputs were adjusted to achieve a layer ratio of 35/5/25/5/30=40/25/35. The temperature profile is 175 Celsius. The film is collected at a line speed sufficient to produce films of 12, 25, and 50 microns in thickness.

TABLE 5

| Example | Layer | Layer Ratio (%) | Higher Modulus Polymer Blend[1] (wt %) | PP Blend[2] (wt %) | TPS MB[3] (wt % total) (wt % TPS/LMP[4]/ LDPE) | Low Modulus Polymer[5] (wt %) | SMA MB[6] (wt %) |
|---|---|---|---|---|---|---|---|
| Comparative Ex. #1 | — | — | — | — | — | — | — |
| Example #9 | A | 100 | 43 | 0 | 22 14/2/3 | 30 | 5 |
| Example #10 | A | 20 | 43 | 0 | 22 14/2/3 | 30 | 5 |
|  | B | 60 | 100 | 0 | 0 | 0 | 0 |
|  | A | 20 | 43 | 0 | 22 14/2/3 | 30 | 5 |
| Example #11 | A | 60 | 43 | 0 | 22 14/2/3 | 30 | 5 |
|  | B | 40 | 100 | 0 | 0 | 0 | 0 |
| Example #12 | A | 50 | 25 | 0 | 40 26/4/5 | 30 | 5 |
|  | B | 50 | 0 | 100 | 0 | 0 | 0 |
| Example #13 | A | 40 | 43 | 0 | 22 14/2/3 | 30 | 5 |
|  | B | 25 | 25 | 0 | 40 26/4/5 | 30 | 5 |
|  | C | 35 | 100 | 0 | 0 | 0 | 0 |

[1]80 wt % Dowlex 2045G, 20 wt % Profax 7624
[2]Polypropylene blend
[3]Cardia BLF-04
[4]Dow Attane 4404G
[5]Dow Attane 4404G
[6]Ampacet 10090, 5-5.5 wt % erucamide in LDPE

TABLE 6

| | | Expert Panel Results | | | 2% Secant Modulus (MPa) | | Ultimate Strength (MPa) | |
|---|---|---|---|---|---|---|---|---|
| Example | Layers | Softness | Noise From Crinkle | Not Tacky | MD | CD | MD | CD |
| Comparative Ex. #1 | A | 8.8 | 4.2 | 7.8 | 89 | 92 | 18 | 28 |
| Example 9 | A | 5.6 | 6.2 | 4.4 | 183 | 206 | 35 | 28 |
| Example #10 | ABA | 7.7 | 5.3 | 8.3 | 193 | 214 | 39 | 33 |
| Example #11 | AB | 7.8 | 4.8 | 7.9 | 167 | 188 | 35 | 32 |
| Example #12 | AB | 6.6 | 5.9 | 7.2 | 174 | 178 | 43 | 35 |
| Example #13 | ABC | 6.5 | 5.6 | 4.4 | 192 | 178 | 38 | 36 |

Example #10 is an ABA film with soft touch film layers located as external (outer) skin layers while the intermediate (B) layer does not contain TPS. The intermediate B layer contains impact coPP to improve tensile performance. The ultimate strength and 2% secant modulus of Example #10 are satisfactory for high speed converting operations and improved over Example #9. The expert panel rated the softness of Example #10 at 7.7 compared to 5.6 for Example #9, indicating a significant improvement in softness.

Example #11 is an AB film with three soft touch film layers disposed combined as a single external (outer) skin layer. The ultimate strength of this multilayer film is higher compared to Example #9 due to the lower overall content of TPS and low modulus thermoplastic polymer. Example #11 has a softness rating of 7.8 versus 5.6, indicating improved softness due to restricting the soft film layer to the skin layer. Thus, utilization of a soft touch film layer as a skin layer appears to provide the best combination of softness and tensile performance. In fact, the softness begins to approach that of Comparative Example #1 while providing far superior tensile performance.

Example #12 is an AB film with two soft film layers disposed as an external skin layer. The expert panel rated the softness slightly lower compared to Example #11, although the tensile properties were slightly improved due to less TPS and low modulus thermoplastic polymer.

Example #13 is an ABC film comprising two A layers, one B layer and two C layers. The A and B layers comprise different concentrations of TPS. The tensile performance of this film is slightly lower in modulus while CD strength is improved. The overall softness of this film is 6.5 relative to 5.6 for Example #9 while having similar tackiness.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a film layer having a micro-textured surface, comprising:
    extruding a heated film composition through an annular die to form a tube comprising the film composition, wherein the film composition comprises from 10wt % to 45 wt % of a thermoplastic starch, from 0.05 wt % to 0.5 wt % of a surface migratory agent, and from 10 wt % to 100 wt % of a low modulus thermoplastic polymer having a 2% secant modulus from about 30 MPa to about 75MPa;
    cooling the tube; and
    forming a film layer from the tube, the film layer having a micro-textured surface and a continuous phase and a discrete phase comprising the thermoplastic starch, wherein the film layer has a has a 2% secant modulus in the MD direction greater than 160 MPa.

2. The method according to claim 1, further comprising introducing air into the center of the die to form the tube.

3. The method according to claim 1, further comprising collapsing the tube to form the film layer.

4. The method according to claim 1, wherein the low-modulus thermoplastic polymer is a very low density polyethylene.

5. The method according to claim 1, wherein the low modulus thermoplastic polymer has a density from about 0.855 g/cm$^3$ to about 0.915 gm/cm$^3$.

6. The method according to claim 1, wherein the surface migratory agent (SMA) is selected from the group consisting of aliphatic acid amides, aliphatic acid esters, waxes, hydrogenated soy bean oil (HSBO), hydrogenated castor oil (HCO), tristearin, silicone oils, metal soaps, and combinations thereof.

7. The method according to claim 1, wherein said surface migratory agent (SMA) is selected from the group consisting of long-chain fatty acids, long-chain fatty acid amides, primary mono-unsaturated long-chain carboxylic acid amides, and combinations thereof.

8. The method according to claim 1, wherein said surface migratory agent is a primary mono-unsaturated long-chain carboxylic acid amide selected from the group consisting of erucamide, oleamide, derivatives thereof, and combinations thereof.

9. The method according to claim 1, wherein said surface migratory agent is erucamide.

10. The method according to claim 1, wherein the thermoplastic starch is formed from corn starch and a plasticizer comprising glycerol and sorbitol.

11. The method according to claim 1, wherein the micro-textured surface is characterized by:
    an average surface roughness (Sa) of from 0.1 to 2 µm;
    an areal material ratio (mr50) value of from 10% to 100%; and
    a root mean square gradient ("Sdq") value of from 0.4 to 10.

* * * * *